(12) United States Patent
Hajjar et al.

(10) Patent No.: US 9,998,717 B2
(45) Date of Patent: Jun. 12, 2018

(54) SCANNING BEAM DISPLAY SYSTEM

(71) Applicant: Prysm, Inc., San Jose, CA (US)

(72) Inventors: Roger A. Hajjar, San Jose, CA (US);
Victor A. Ruskovoloshin, Dublin, CA (US)

(73) Assignee: Prysm, Inc., San Jose, CA (US)

( * ) Notice: Subject to any disclaimer, the term of this patent is extended or adjusted under 35 U.S.C. 154(b) by 527 days.

(21) Appl. No.: 14/583,023

(22) Filed: Dec. 24, 2014

(65) Prior Publication Data
US 2016/0191870 A1 Jun. 30, 2016

(51) Int. Cl.
*G02B 26/12* (2006.01)
*H04N 9/31* (2006.01)
(Continued)

(52) U.S. Cl.
CPC ......... *H04N 9/3129* (2013.01); *G02B 26/101* (2013.01); *G02B 26/12* (2013.01); *G02B 26/123* (2013.01); *G09G 1/143* (2013.01); *G09G 1/20* (2013.01); *G09G 3/002* (2013.01); *H04N 9/3132* (2013.01); *G09G 2300/023* (2013.01); *G09G 2300/026* (2013.01); *G09G 2300/0452* (2013.01); *G09G 2310/0205* (2013.01); *G09G 2310/0227* (2013.01); *G09G 2310/0235* (2013.01); *G09G 2320/0209* (2013.01);
(Continued)

(58) Field of Classification Search
CPC ...... G02B 26/12; G02B 26/101; G02B 26/10; G02B 26/123; G09G 2300/023; G09G 2300/0452; G09G 2300/026; G09G 2310/0235; G09G 2310/0205; G09G 2310/0027; H04N 9/3129; H04N 9/3161; H04N 9/31

USPC ............................................. 353/31; 348/203
See application file for complete search history.

(56) References Cited

U.S. PATENT DOCUMENTS

| 7,869,112 B2 | 1/2011 | Borcher et al. |
| 7,878,657 B2 | 2/2011 | Hajjar |

(Continued)

FOREIGN PATENT DOCUMENTS

WO  WO 00/20912  4/2000

OTHER PUBLICATIONS

Extended European Search Report received in European Patent Application No. 15 200 013.9, Received Apr. 4, 2016. 11 pages.

*Primary Examiner* — Steven H Whitesell Gordon
*Assistant Examiner* — Jerry Brooks
(74) *Attorney, Agent, or Firm* — Fish & Richardson P.C.

(57) ABSTRACT

A scanning beam display system includes an optical module, an image control module, and a display screen on which optical beams are scanned. The optical module includes a vertical adjuster placed in the optical paths of the beams to control and adjust positions of the optical beams along a generally vertical direction on the display screen, and a control unit configured to receive control instructions for the vertical adjuster and to control the vertical adjuster to be at one of a predetermined number of orientations to place the scanning optical beams at a corresponding distinct position on the display screen. The control unit is further configured to apply an adjustment offset to each orientation of the vertical adjuster such that each immediately vertically adjacent pair of beam footprints projected on the display screen resulting from the plurality of positions have a vertical overlap that is larger than a first threshold.

18 Claims, 20 Drawing Sheets

(51) Int. Cl.
  *G09G 1/14* (2006.01)
  *G09G 1/20* (2006.01)
  *G09G 3/00* (2006.01)
  *G02B 26/10* (2006.01)

(52) U.S. Cl.
  CPC ........... *G09G 2320/0233* (2013.01); *G09G 2320/0242* (2013.01); *G09G 2340/0464* (2013.01); *G09G 2340/0471* (2013.01); *G09G 2340/0478* (2013.01); *G09G 2360/14* (2013.01)

(56) References Cited

U.S. PATENT DOCUMENTS

| | | | | |
|---|---|---|---|---|
| 2002/0180869 | A1* | 12/2002 | Callison | G02B 26/08 348/195 |
| 2009/0141192 | A1* | 6/2009 | Nojima | H04N 9/3147 348/745 |
| 2010/0020377 | A1* | 1/2010 | Borchers | G02B 26/123 359/216.1 |
| 2011/0298820 | A1 | 12/2011 | Hajjar | |
| 2012/0176347 | A1* | 7/2012 | Mahajan | G09G 5/00 345/204 |
| 2013/0335641 | A1 | 12/2013 | Aoki et al. | |

* cited by examiner

| | Image 1 | Image 2 | Image 3 | Image 4 |
|---|---|---|---|---|
| Field 1 | A | A | A | A |
| Field 2 | B | B | B | B |

FIG. 17A

| | Image 1 | Image 2 | Image 3 | Image 4 |
|---|---|---|---|---|
| Field 1 | A | A | A | A |
| Field 2 | A | B | A | B |
| Field 3 | B | B | B | B |

FIG. 17B

| | Image 1 | Image 2 | Image 3 | Image 4 |
|---|---|---|---|---|
| Field 1 | A | A | A | A |
| Field 2 | (A+B)/2 | (A+B)/2 | (A+B)/2 | (A+B)/2 |
| Field 3 | B | B | B | B |

FIG. 17C

|         | A       | A       | A       | A       |     |
|---------|---------|---------|---------|---------|-----|
|         | B       | B       | B       | B       |     |
|         | C       | C       | C       | C       | ... |

Field 1 / Field 2 / Field 3 — Image 1, Image 2, Image 3, Image 4 ...

SCANNING BEAM DISPLAY SYSTEM

TECHNICAL FIELD

This application generally relates to display systems that scan one or more optical beams onto a screen to display images.

BACKGROUND

Display systems can be configured as scanning-beam display systems which scan one or more optical beams that are modulated over time to carry optical pulses as the beam moves over a screen in a raster scanning pattern to form images on a screen. Each scanning beam has a small beam footprint that is less than or equal to a subpixel on the screen and the beam footprint scans the subpixel and is modulated in optical power or intensity in the time domain to carry images. Raster scanning of such a modulated beam on the screen converts images carried by the sequential optical pulses into spatial patterns as images on the screen.

SUMMARY

According to one aspect, a scanning beam display system includes an optical module, an image control module that is configured to receive image information and convey corresponding pixel information to the optical module, where the optical module being configured to produce a plurality of optical beams that are modulated based on the pixel information to thereby convey images to be displayed, and a display screen configured to receive the plurality of optical beams to display images conveyed by the optical beams, where the plurality of optical beams are scanned in a generally horizontal direction across the display screen. Each of the optical beams convey pixel information. The optical module includes a vertical adjuster placed in the optical paths of the optical beams to control and adjust positions of the optical beams along a generally vertical direction on the display screen, and a control unit configured to receive control instructions for the vertical adjuster and to control the vertical adjuster to be at one of a predetermined number of orientations to place the scanning optical beams at a corresponding distinct position along the vertical direction on the display screen, where the control unit causes the vertical adjuster to reorient periodically to another of the orientations. The control unit is further configured to apply an adjustment offset associated with each orientation of the vertical adjuster such that each immediately vertically adjacent pair of beam footprints projected on the display screen resulting from the plurality of positions have a vertical overlap that is larger than a first threshold.

Implementations of this aspect may include one or more of the following features. For example, the control unit may be further configured to decrease an optical energy associated with each beam footprint such that the resulting vertical overlap of each immediately vertically adjacent pair of beam footprints is less than a second threshold. The second threshold may be a maximum allowable size associated with the vertical overlap between any two immediately vertically adjacent beam footprints. The second threshold may be a maximum allowable intensity of the vertical overlap between any two immediately vertically adjacent beam footprints. Decreasing the optical energy may reduce a height of the corresponding beam footprint. The optical module may further include a polygon scanner positioned in the optical paths of the optical beams and comprising a rotation axis around which the polygon scanner rotates to scan the optical beams horizontally across the display screen. The polygon scanner may include a plurality of polygon facets that are each sized to simultaneously receive the optical beams and each tilted with respect to the rotation axis at different facet tilt angles, respectively, to scan the optical beams horizontally at different vertical positions on the display screen, respectively. The vertical adjuster may reorient to a different orientation after each complete rotation of the polygon scanner. The vertical adjuster, by switching between the predetermined number of orientations, may cause the beam footprints to be projected on the display screen over time such that there are no gaps in the vertical direction between immediately vertically adjacent pairs of beam footprints. The predetermined number of orientations may be three or more. The orientations of the vertical adjuster may be separated by equidistant angles. The orientations of the vertical adjuster may be separated by non-equidistant angles. The pixel information associated with each orientation of the vertical adjuster for a vertically continuous group of beam footprints may be different. The pixel information associated with two of the orientations of the vertical adjuster for a vertically continuous group of beam footprints may be same. The pixel information associated with one of the orientations of the vertical adjuster for a vertically continuous group of beam footprints may be interpolated from the pixel information associated with two other orientations of the vertical adjuster for the vertically continuous group of beam footprints. The control unit may be configured to increase or decrease an optical energy associated with each beam footprint to limit non-uniformity in screen brightness.

The scanning beam display system according to this aspect may further include a memory configured to store beam footprint information of a beam footprint formed by each of the optical beams on the display screen, where the beam footprint information including beam height data and position data of the beam footprint, and where the control unit is configured to receive control instructions that are determined based on the stored beam footprint information. The memory may be configured to receive beam footprint information from a beam footprint determination unit. The optical module may include the beam footprint determination unit.

A scanning beam display array may include two or more scanning beam display systems according to this aspect, where the two or more scanning beam display systems may be arranged adjacent to each other, and where the orientations and associated adjustment offsets of each of the corresponding vertical adjusters may be synchronized.

According to another aspect, a scanning beam display array may include two or more scanning beam display systems according to this aspect, where the two or more scanning beam display systems may be arranged adjacent to each other, and where the orientations and associated adjustment offsets of each of the corresponding vertical adjusters may be synchronized. According to another aspect, a scanning beam display system may include an optical module, an image control module that is configured to receive image information and convey corresponding pixel information to the optical module, where the optical module is configured to produce a plurality of optical beams that are modulated based on the pixel information to thereby convey images to be displayed, and a display screen configured to receive the plurality of optical beams to display images conveyed by the optical beams, where the plurality of optical beams being scanned in a first direction across the display screen. Each of the optical beams conveys pixel information. The optical module includes an adjuster placed in the optical paths of the optical beams to control and adjust positions of the optical beams along a second direction on the display screen, where the second direction is transverse to the first direction, and a control unit configured to receive control instructions for the adjuster and to control the adjuster to be at one of a predetermined number of orientations to place the scanning optical beams at a corresponding distinct position along the second direction on the display screen, where the control unit causes the adjuster to reorient periodically to another of the orientations. The control unit is further configured to apply an adjustment offset associated with each orientation of the adjuster such that each pair of beam footprints that are projected on the display screen resulting from the plurality of positions and are immediately adjacent to each other along the second direction have an overlap along the second direction that is larger than a first threshold.

Implementations of this aspect may include one or more of the following features. For example, the adjuster may be configured to adjust positions of the optical beams along the second direction that is orthogonal to the first direction.

DESCRIPTION OF DRAWINGS

FIGS. 17A-D illustrate example assignments of pixel values across multiple image fields over time.

FIGS. 18A and B illustrate example assignments of pixel values across multiple image fields over time based on 8 refreshes per video frame.

Like reference symbols in the various drawings indicate like elements.

DETAILED DESCRIPTION

Figure 1:
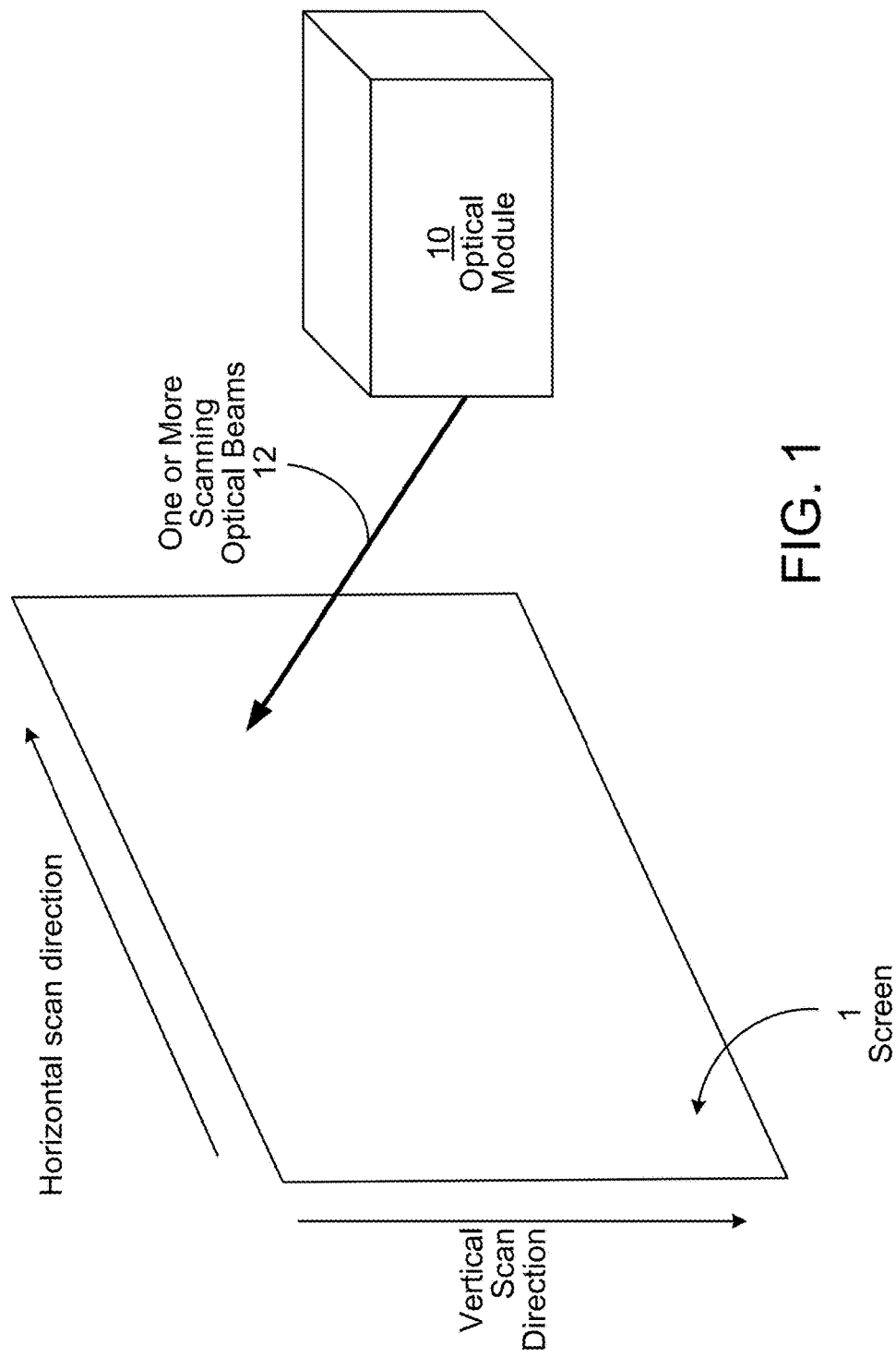
FIG. 1 illustrates an example scanning beam display system.

Display systems that scan one or more optical beams onto a screen to display images can be implemented in various configurations. For example, in some implementations, the screen may be a passive screen that does not emit light and directly uses the light of the one or more scanning optical beams to form the images by, e.g., reflecting, transmitting, diffusing or scattering the light of the one or more scanning optical beams. In a rear projection mode with red, blue and green beams carrying images respectively in red, green and blue colors, the passive screen receives the red, green and blue beams from one side and diffuses, transmits or scatters the received light to produce colored images for viewing on the other side of the screen.

In other implementations, the screen of such a display system may be a light-emitting screen. Light-emitting materials can be included in such a screen to absorb the light of the one or more scanning optical beams and to emit new light that forms the images. The light of the one or more scanning optical beams is not directly used in forming the images seen by a viewer. For example, the screen can be a light-emitting screen that emits visible light in colors by converting excitation energy applied to the screen into the emitted visible light, e.g., via absorption of excitation light. The emitted visible light forms the images to a viewer. The screen can be implemented to include multiple screen layers, one or more of which have light-emitting components that convert the excitation energy into the emitted visible light that forms the images.

In the above as well as in other implementations, various optical components, such as optical scanning modules that perform the raster scanning of the one or more optical beams and optical lenses, are typically provided in the optical paths of the one or more optical beams before reaching the screen. Under an ideal operating condition, the raster scanning pattern formed by scanning the one or more optical beams on the screen should be spatially uniform and free of distortions to produce the desired images. For example, the raster scanning pattern for a flat rectangular shaped wide screen (e.g., with an aspect ratio of 16:9 in many HDTV systems) should be parallel horizontal scanning lines with even spacing along the vertical direction at all locations where the beam spot size on the screen should be a constant independent of the one or more beam positions on the screen. However, various optical distortions can occur in the optical paths to distort the raster scanning pattern on the screen. For example, the presence of optical scanning modules, optical lenses, and other optical components in the optical paths of the one or more optical beams often cause optical distortions. As a result of such distortions, the quality of the displayed images may be degraded.

One measure of the image quality is the uniformity of the image brightness across the screen. Human eyes are sensitive to variations of brightness. Therefore, optical distortions that lead to non-uniform image brightness across the screen are significant technical issues in high-quality display systems. Unintended spatial variations in beam spot size and line spacing between adjacent scanning lines on the screen are examples of contributing causes for non-uniform image brightness across the screen.

Specific examples of scanning beam display systems based on light-emitting screens are described below to illustrate the local dimming techniques. The techniques can also be applied to scanning beam display systems based on passive screens.

Scanning beam display systems based on light-emitting screens use screens with light-emitting materials such as fluorescent materials to emit light under optical excitation to produce images. A light-emitting screen can include a pattern of light-emitting regions that emit light for forming images and non-light-emitting regions that are spaces void of light-emitting materials between the light-emitting regions. The designs of the light-emitting regions and non-light-emitting regions can be in various configurations, e.g., one or more arrays of parallel light-emitting stripes, one or more arrays of isolated light-emitting island-like regions or pixel regions, or other design patterns. The geometries of the light-emitting regions can be various shapes and sizes, e.g., squares, rectangles or stripes. Examples described below use a light-emitting screen that has parallel light-emitting stripes separated by non-light-emitting lines located between the light-emitting stripes. Each light-emitting stripe can include a light-emitting material such as a phosphor-containing material that either forms a contiguous stripe line or is distributed in separated regions along the stripe.

In one implementation, for example, three different color phosphors or phosphor combinations that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays.

Phosphor materials are one type of fluorescent materials. Various described systems, devices and features in the examples that use phosphors as the fluorescent materials are applicable to displays with screens made of other optically excitable, light-emitting, non-phosphor fluorescent materials, such as quantum dot materials that emit light under proper optical excitation (semiconductor compounds such as, among others, CdSe and PbS).

Examples of scanning beam display systems described here use at least one scanning laser beam to excite color light-emitting materials deposited on a screen to produce color images. The scanning laser beam is modulated to convey image information for red, green and blue colors or in other visible colors and is controlled in such a way that the laser beam excites the color light-emitting materials in red, green and blue colors based on image data from the red, green and blue color channels of the image, respectively. Hence, the scanning laser beam carries the image data but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

In the above and other display implementations, multiple display screens can be placed adjacent to one another in an array to form a larger display screen. While the beam scanning may be synchronized among the multiple display screens to allow for synchronous operation among the multiple screens, real-time adjustments to vertical adjusters, which are further described below, may be made on a per screen basis. In some cases, the orientations and adjustments of multiple, and sometimes all, vertical adjusters in the array may be synchronized with each other.

Referring to FIG. 1, a scanning beam display system based on two-dimensional beam scanning is shown. For example, a polygon scanner with different reflective polygon facets tilted at different tilt facet angles can be used to produce a vertical array of horizontal lines at different vertical positions on the screen. The vertical array of lines may be parallel to one another. While scanning is described below with respect to the polygon scanner, various other types of scanners may also be used to produce the horizontal lines. A vertical adjuster, for example a galvo-driven mirror, can be used to adjust vertical positions of the horizontal lines in one group to relative to vertical positions of the horizontal lines in another group produced in time subsequent to the prior group on the screen. The vertical adjuster can be controlled to produce an interlaced scanning pattern formed by the two or more groups of the horizontal lines or other scanning patterns. As used herein, the vertical and horizontal directions are used to represent two generally orthogonal directions and are not intended to represent any specific directions such as the vertical direction with respect to the earth's gravity. Additionally, or alternatively, a beam that is scanned in the vertical or horizontal directions may produce lines that are non-linear, for example curved.

The system illustrated in FIG. 1 includes a screen 1 on which images are displayed and an optical module 10 that produces and scans one or more scanning optical beams 12 onto the screen 1. An optical beam 12 is modulated to convey image information. For example, the optical beam 12 can pulsed to be a sequence of laser pulses that carry image data. The optical module 10 can scan the one or more optical beams 12 in a raster scan pattern to display the images on the screen 1, for example using the polygon scanner and the vertical adjuster as described above, which may be included as part of the scanning module inside the optical module 10. The optical module can further include a scanning control module to control the scanning of the beams.

When using the polygon scanner, the polygon scanner can be positioned in optical paths of the one or more optical beams 12. The polygon scanner is rotatable about a rotation axis along the vertical direction. In operation, the polygon scanner rotates around this rotation axis and the optical beams 12 impinge the polygon scanner such that the polygon scanner scans the optical beams 12 horizontally on the screen 1 along the horizontal scanning direction as shown.

The polygon is designed to have multiple polygon facets that are sized to simultaneously receive the one or more optical beams 12 directed from the one or more lasers. The polygon facets are reflective to light of the optical beams 12 and tilted with respect to the rotation axis at different tilt angles, respectively, such that the different facets scan the optical beams horizontally at different vertical positions on the screen, respectively. The vertical adjuster is placed in the optical paths of the optical beams 12 to adjust vertical positions of the optical beams on the screen.

In operation, the polygon scanner rotates to scan the scanning beams. Each polygon facet receives, reflects, and scans the one or more beams 12 horizontally on the screen 1. The immediate next polygon facet is tilted at a different tilt angle from the previous facet and thus receives, reflects and scans the same one or more beams 12 horizontally at different vertical positions on the screen 1. In systems with multiple optical beams 12, the different optical beams from one polygon facet are directed to different vertical positions on the screen 1. As different polygon facets sequentially take turns to perform the horizontal scanning of the one or more beams 12 as the polygon scanner rotates, the vertical positions of the one or more beams 12 on the screen 1 are stepped vertically at different positions along the vertical stepping direction without a conventional vertical scanner. During the time when a facet scans the one or more beams 12 on the screen 1, the vertical adjuster can be operated at a fixed orientation so that each beam 12 is being scanned only along the horizontal direction without a simultaneous vertical scanning. After a full rotation of the polygon scanner and before its next full rotation, the vertical adjuster can be operated to be at a different fixed orientation so that each facet of the polygon scanner during a succeeding rotation now scans the beams horizontally at different vertical portions of the screen as before. In some cases, the vertical adjuster may be adjusted during a rotation of the polygon scanner such that, for example, the position of the vertical adjuster is changed after each facet scans the beams. In some cases, the vertical adjuster may be adjusted while the facet scans the beams. Such adjustments made during the rotation of the polygon scanner can help, for example, to improve vertical fill in real time.

U.S. patent application Ser. No. 12/180,114 entitled "BEAM SCANNING SYSTEMS BASED ON TWO-DIMENSIONAL POLYGON SCANNER" and filed on Jul. 25, 2008 (now U.S. Pat. No. 7,869,112) describes examples of polygon scanners suitable for use with the display systems described in this application and is incorporated by reference as part of the specification of this application.

Figure 2:
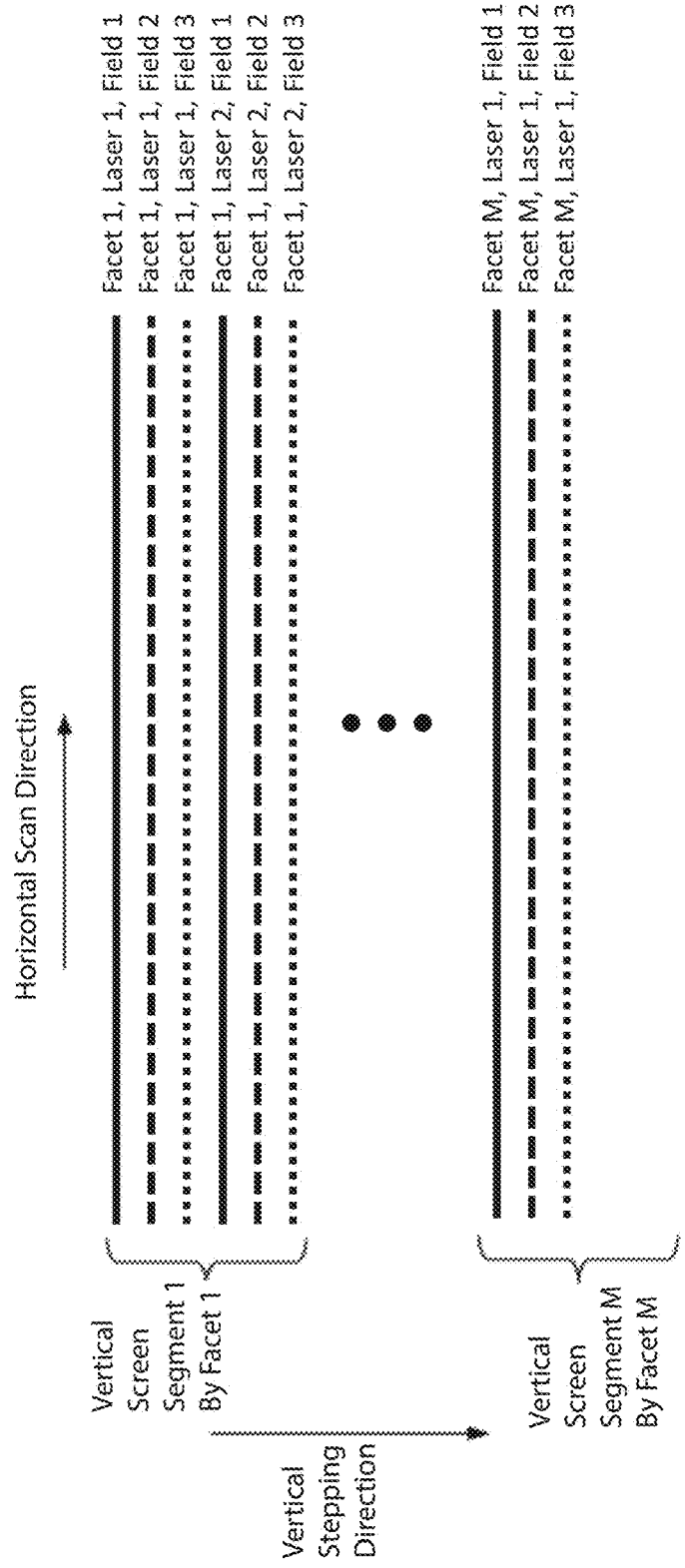
FIG. 2 illustrates an example scanning pattern for filling the screen produced by using a polygon scanner to scan multiple laser beams and using a vertical adjuster to interlace three fields.

FIG. 2 illustrates one example of interlaced raster scanning that can be achieved, for example, using the 2D polygon scanner and the vertical adjuster. Assuming, for example, that there are M facets in the polygon and N optical beams 12, the tilt facet angles of the polygon facets can be designed to vertically divide the screen into M vertical segments to project N horizontal scan lines in each vertical segment.

More specifically, as the polygon rotates, the different facets direct and scan different vertical segments at different times, one at a time. Hence, scanning by different polygon facets in one full rotation of the polygon scanner produces a frame or field of M×N horizontal scanning lines that are made of M sequential sets of N simultaneous horizontal lines. This operation provides both horizontal scanning by each facet and vertical stepping by sequentially changing the polygon facets. Therefore, in one full rotation, the polygon scanner produces one frame of a sequential set of simultaneous horizontal scanning lines on the screen produced by the polygon facets, respectively and each polygon facet produces one set of simultaneous and horizontal scanning lines.

Notably, during each full rotation, the vertical adjuster is controlled to be at one of a predetermined number of orientation. After completion of one full rotation of the polygon and before the next full rotation of the polygon, the vertical adjuster is operated to transition and stabilize to another one of the predetermined number of orientations to thereby change vertical positions of the optical beams 12 on the screen 1 to spatially interlace horizontal scanning lines in one frame produced in one full rotation of the polygon scanner with horizontal scanning lines of a subsequent frame produced in an immediate subsequent full rotation of the polygon scanner. The vertical adjuster and the polygon scanner are synchronized to each other to perform the above interlaced raster scanning. As further explained below, the number of orientations for the vertical adjuster is determined so as to maximize the vertical fill factor between adjacent laser beam scans—in other words to minimize any gap between the horizontal lines.

In the example shown in FIG. 2, each full frame image is formed by three frames or fields, Field 1, Field 2, and Field 3, which are spatially interlaced, with the line spacing between adjacent lines produced by each facet being minimized or eliminated altogether. Hence, the vertical adjuster in this example, is operated to operate at three orientations, one orientation for the Field 1, another for the Field 2, and yet another for the Field 3, respectively. In this specific example, the rate for the vertical adjustment of the beam position is only three orientation adjustments per full frame. The vertical adjuster may switch between the fields during a blanking period, which can be provided after each full rotation of the polygon mirror by turning off the beam for a short period of time, in order to minimize any undesired visual effects on the screen. In this specific example, the blanking typically occurs when the two adjacent facets with the greatest change in tilt angle to the polygon rotation axis between them are in transition from one facet to the other, when the beams are to impinge on the one facet to the next.

Interlacing three image fields, where each field is associated with a predetermined orientation of the vertical adjuster, is illustrated in the example in FIG. 2. Here, the number of scanning lines between two successive lines on the screen that are produced by reflection of beams from a single polygon facet—for example successive lines produced on the screen for Field 1 by Laser 1 and Laser 2—is (P−1) where P is the number of fields to be interlaced and is an integer not less than 3. That is, to ensure that there are no imaging illumination gaps between immediately vertically adjacent scanning lines that are ultimately conveyed on to the screen over time, the scanning lines on the screen formed by two neighboring laser beams reflected from a single polygon facet should be spaced apart by two horizontal lines or less in order to interlace three fields while avoiding any vertical gaps there between. Additionally, interlacing additional fields, for example going from two interlaced image fields to three as described above, can help increase vertical resolution as having more scanned lines can lead to higher pixel density in the vertical direction.

Figure 3:
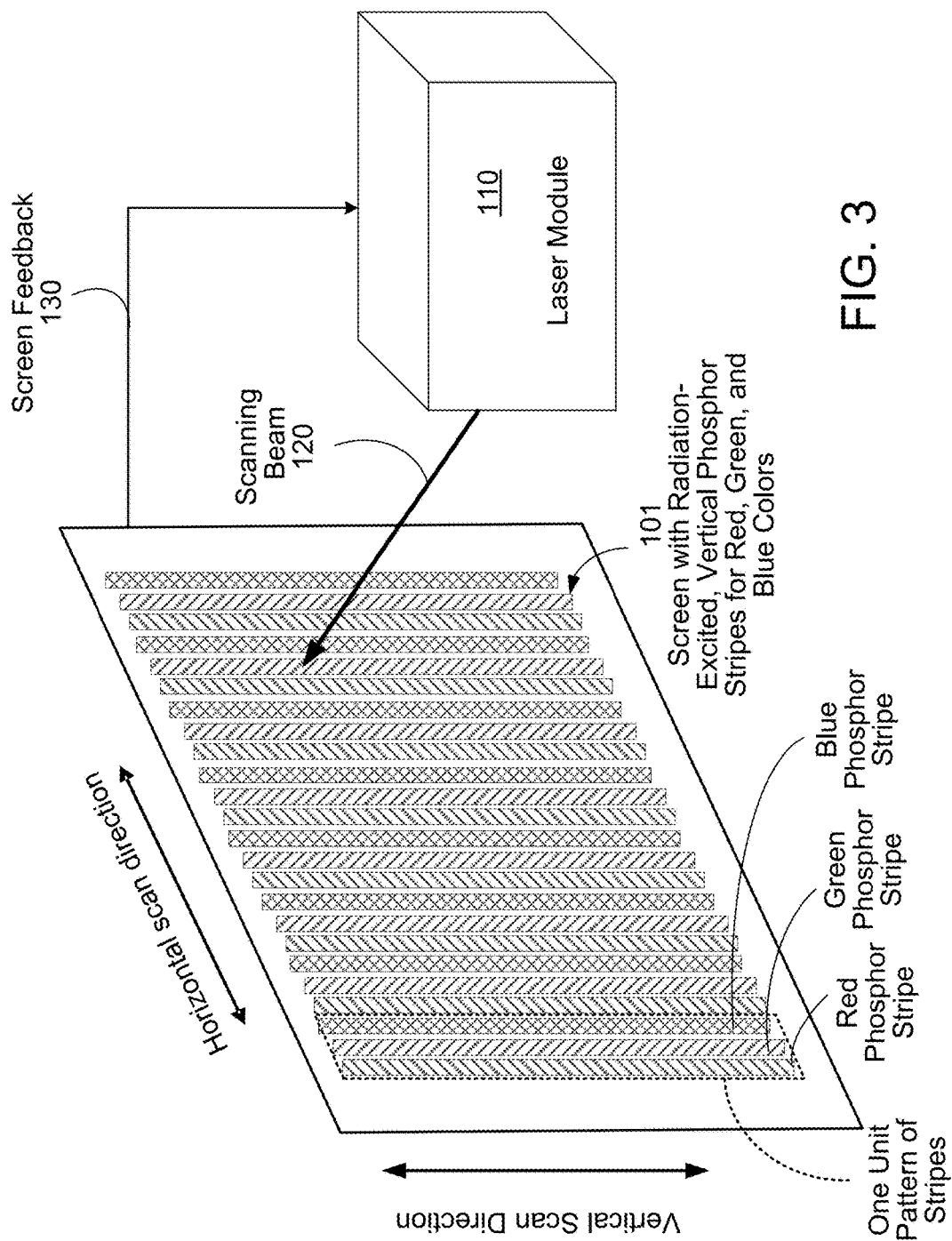
FIG. 3 illustrates an example scanning beam display system having a screen having fluorescent stripes.

Referring to FIG. 3, an example of a laser-based display system using a screen having color phosphor stripes is shown. Alternatively, color phosphor dots or quantum dot or quantum dot regions may also be used to define the image pixels on the screen. The illustrated system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Each group of three adjacent color phosphor stripes contains stripes for the three different colors. One particular spatial color sequence of the stripes is shown in FIG. 3 as red, green and blue. Other color sequences may also be used.

The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear light engine systems where the viewer and the laser module 110 are on the opposite sides of the screen 101. Alternatively, such display systems may be configured as front light engine systems where the viewer and laser module 110 are on the same side of the screen 101.

Figure 4A:
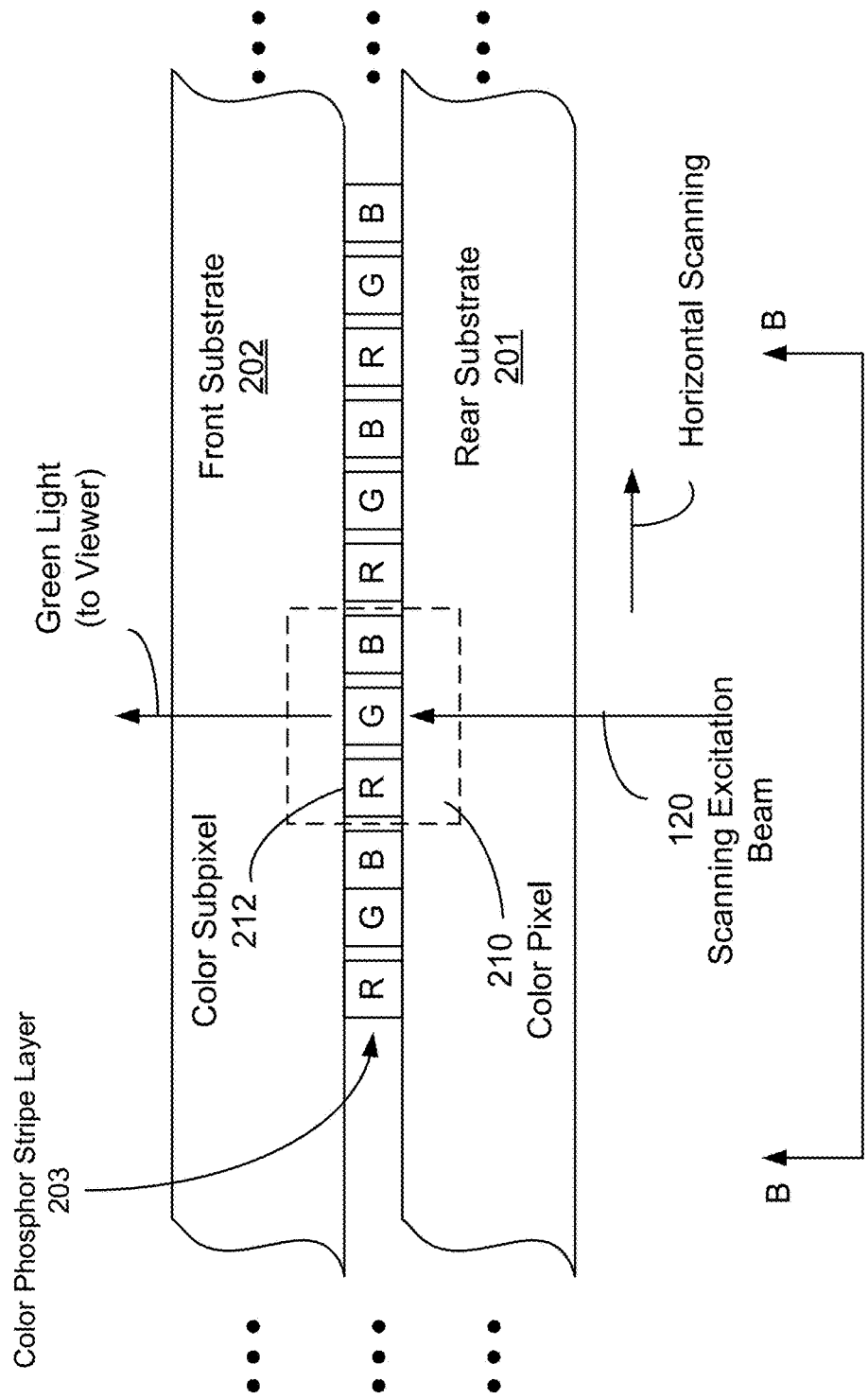
FIG. 4A illustrates a side cross-section view of the fluorescent screen in FIG. 3.
Figure 4B:
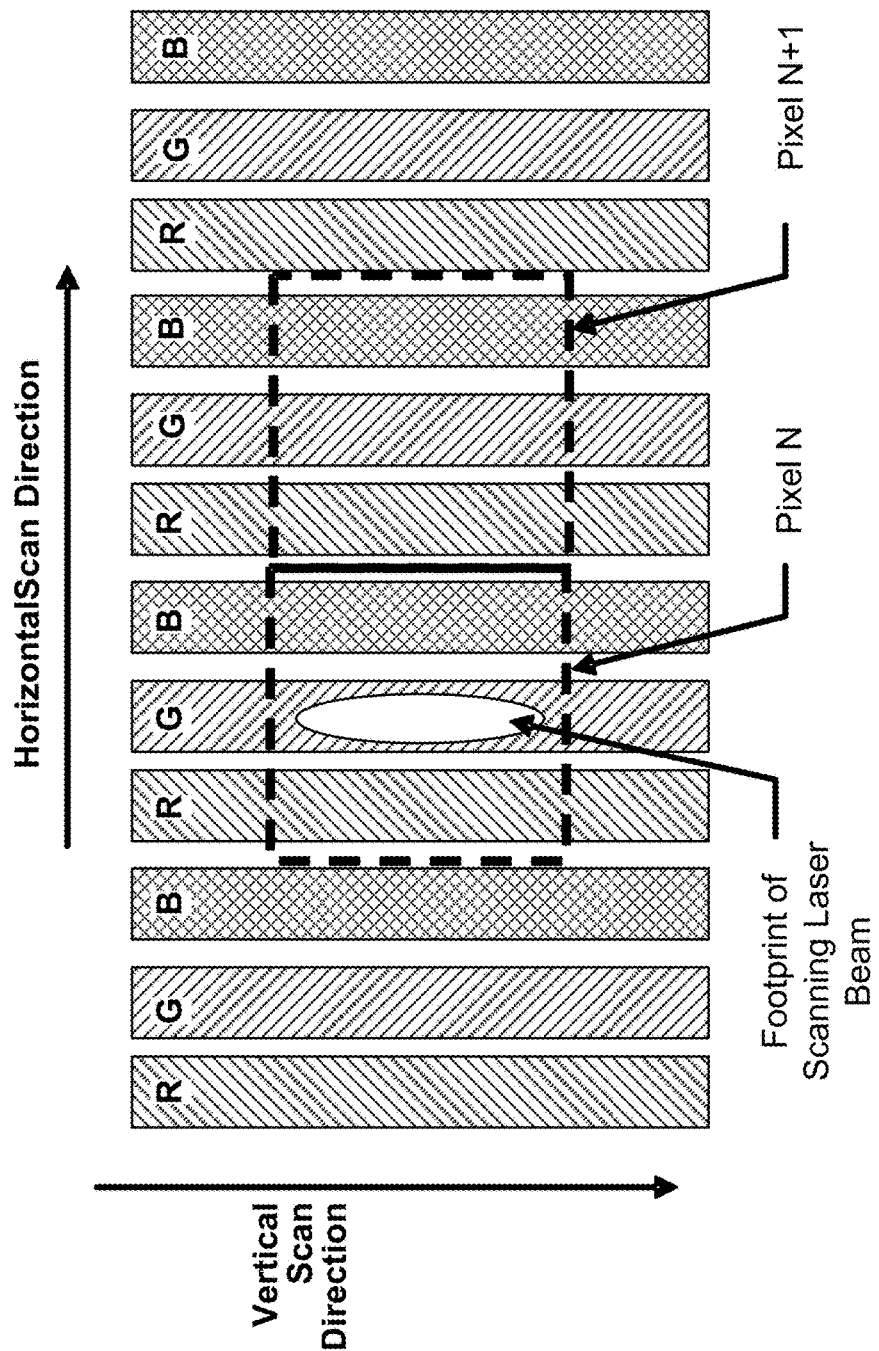
FIG. 4B illustrates a close-up view of the fluorescent screen in FIG. 4A along the direction B-B.

In the example scenario illustrated in FIG. 4A, the scanning laser beam 120 is directed at the green phosphor stripe within a pixel to produce green light for that pixel. FIG. 4B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Accordingly, the laser beam 120, which is modulated to carry optical pulses with image data, needs to be aligned with respect to proper color pixels on the screen 101. The laser beam 120 is scanned spatially across the screen 101 to hit different color pixels at different times. Accordingly, the modulated beam 120 carries the image signals for the red, green and blue colors for each pixel at different times and for different pixels at different times. Hence, the beams 120 are coded with image information for different pixels at different times. The beam scanning thus maps the timely coded image signals in the beams 120 onto the spatial pixels on the screen 101.

A scanning display system described in this application can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging, and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red spot in the intended image may be displayed as a green spot on the screen as the beam is on when the beam is over the green phosphor region, instead of the intended adjacent red phosphor region. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

A feedback control alignment mechanism can be provided in the system in FIG. 3 to maintain proper alignment of the scanning beam 120 on the desired subpixel to achieved desired image quality. The screen 101 is used to provide a screen feedback signal 130 to indicate the alignment status of the beam 120 using timing information. The alignment feedback control system determines spatial information derived from timing information, the control module 110 responds to the timing information in the screen feedback to control the scanning beam 120 to compensate for spatial positioning error. Such feedback control can include reference marks on the screen 101, both in the fluorescent area and in one or more peripheral area outside the fluorescent area, to provide feedback light that has a timing and/or positioning effect on the excitation beam 120 and represents the position and other properties of the scanning beam on the screen 101. The feedback light can be measured by using one or more optical servo sensors to produce a feedback servo signal. A servo control in the laser module 110 processes this feedback servo signal to extract the information on the beam positioning and other properties of the beam on the screen and, in response, adjust the timing of the scanning beam 120 modulation to ensure the proper operation of the display system. The feedback light may be the same light as the excitation light or a light of a frequency different from the excitation light. The feedback light may be an IR range light that is used to detect the reference marks on screen 101 The IR laser position is calibrated against the scanning beam 120 using on or off panel reference marks.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness.

For another example, a screen calibration procedure can be performed at the startup of the display system to measure the beam position information as a calibration map. This calibration map is then used by the laser module 110 to control the timing and positioning of the scanning beam 120 to achieve the desired color purity. In some cases, the calibration procedure can also include measuring beam footprint information as a function of the beam position, as further detailed below. For yet another example, a dynamic servo control system can be provided to regularly update the calibration map during the normal operation of the display system by using servo reference marks in the fluorescent area of the screen to provide the feedback light without affecting the viewing experience of a viewer.

Figure 5:
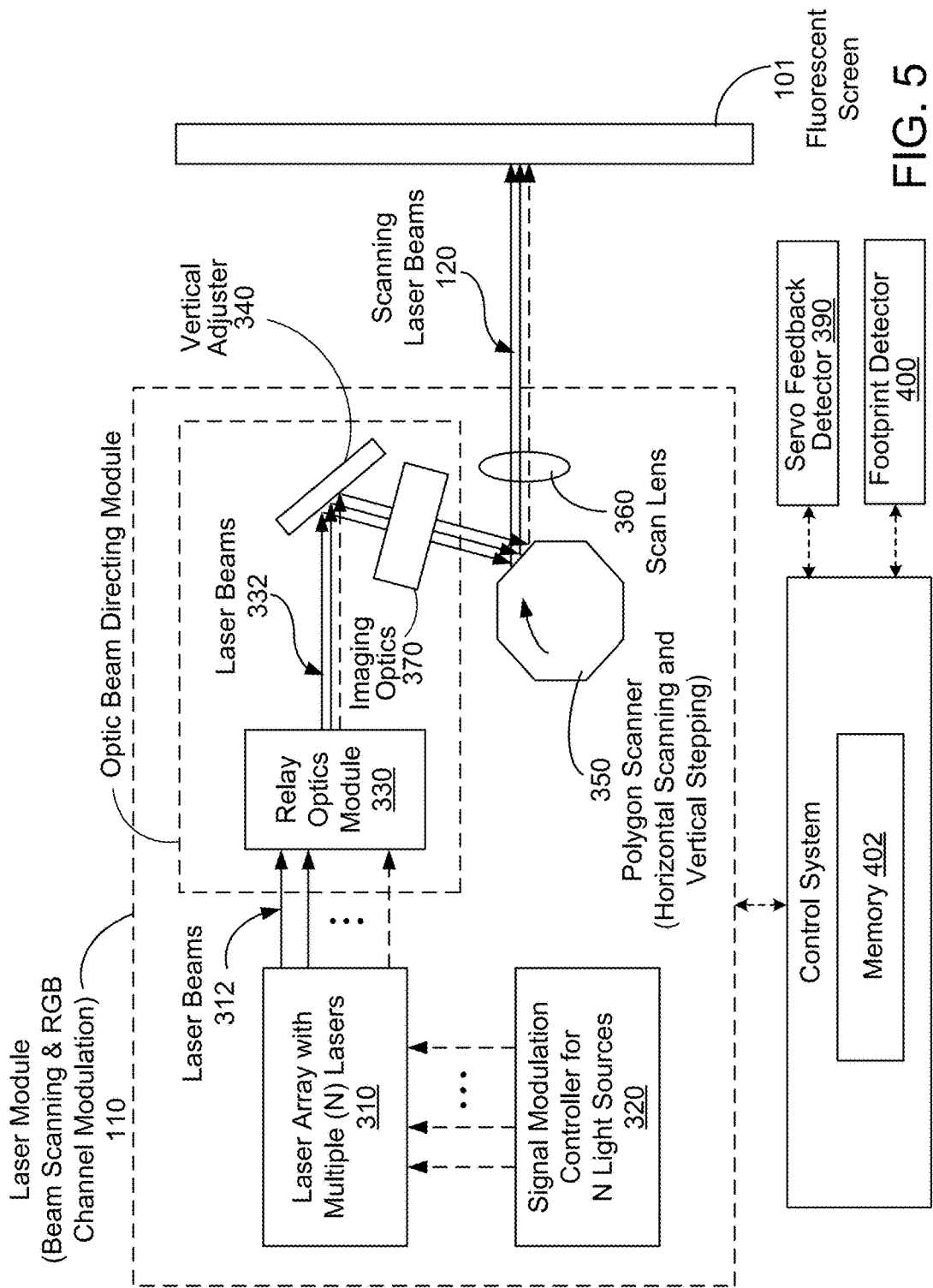
FIG. 5 illustrates an example implementation of a laser module from the system in FIG. 3.

Referring now to FIG. 5, an example implementation of the laser module 110 in FIG. 3 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning in the system illustrated in FIG. 5 may be achieved by using a vertical adjuster 340 such as a galvo mirror for the vertical scanning and a multi-facet polygon scanner 350 with different facets tilted at different angles. A scan lens 360 can be used to focus the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the vertical adjuster 340 and then from the vertical adjuster 340 to the polygon scanner 350 which scans the received laser beams as output scanning beams 120 onto the screen 101. A relay optics module 330 may be placed in the optical path of the laser beams 312 to modify the spatial property of the laser beams 312 and to produce a closely packed bundle of beams 332 for scanning by the polygon scanner 350. The scanning beams 120 focused onto the screen 101 excite the phosphors and the optically excited phosphors emit colored light to display visible images. The laser beams 312, 120 are illustrated in FIG. 5 as separated along horizontal axis so that the multiple beams can be seen; but in practice the beams would be aligned horizontally and separated along the vertical axis (into/out of the page).

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatially based pixel locations on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination for each pixel, and desired image brightness. The modulation being a pulse width modulation, a pulse amplitude modulation, or a combination of both. The laser diodes are also separately biased with a proper threshold current to enable fast rise and fall times or switching speeds.

In some implementations, an imaging module 370 can be placed in the optical path between the vertical adjuster 340 and the polygon to image the surface of the reflective surface of the vertical adjuster 340 onto a polygon facet that currently reflects the beams to the screen 101. This imaging effectively makes the vertical adjuster 340 coincident with the currently reflecting polygon facet which, in turn, is coincident with the entrance pupil of the scan lens 360. Therefore, the entrance pupil of the scan lens 360 is the pivot point for the scanning beams directed to the scan lens 360. The imaging module 370 can be in various optical configurations and may include, for example, two lenses in a 4F imaging configuration with a magnification of 1.

In some implementations, the scanning beam display system can include an invisible servo beam to provide additional positional feedback. For example, a controller 380 can be used to provide control functions and control intelligence based on servo detector signals from one or more servo beam detectors 390 that detect servo feedback light from the screen 101. U.S. patent application Ser. No. 11/769,580 entitled "SERVO FEEDBACK CONTROL BASED ON INVISIBLE SCANNING SERVO BEAM IN SCANNING BEAM DISPLAY SYSTEMS WITH LIGHT-EMITTING SCREENS" and filed on Jun. 27, 2007 (now U.S. Pat. No. 7,878,657) describes examples of servo feedback control suitable for use with the display systems described in this application and is incorporated by reference as part of the specification of this application.

In some implementations, a beam footprint detector 400 may be provided in the display system to output a measured footprint of the focused beam on the screen 101. Alternatively, or additionally, the beam footprint detector 400 may be a standalone measurement device that can be used to measure beam footprint information at multiple different positions on the screen. The beam footprint measurement can be recorded for each subpixel of the screen on which the beam is focused in order to, for example, produce a beam footprint map for the entire screen. Beam footprint information can include a height and a width of the optical beam that is projected on the screen 101 as the beam is modulated and scanned across the screen 101. In some implementation the beam footprint information can include an arbitrary shape of the optical beam that is projected on the screen 101 and that may change as the beam is modulated and scanned across the screen 101. In some implementation the beam footprint information can include information about intensity hot spots within the detected shape of the optical beam that is projected on the screen 101 as the beam is modulated and scanned across the screen 101. The control system 380 may be configured to access a memory 402 that can store the beam footprint information associated with each beam position on the screen. In some cases, beam footprint information may be pre-stored onto the memory 402, either through information obtained via the footprint detector 400 or via other means. Alternatively, or additionally, the beam footprint information may be entered/updated in real time during operation of the display system based on input from the footprint detector 400.

As noted above, any gaps between adjacent scanning lines projected on the screen should be avoided. Otherwise, the viewer may be able to detect a black line that runs across the screen, particularly if the viewer is positioned close to the screen. Accordingly, the vertical adjuster should be configured to have a sufficient number of positions so that there are no gaps between vertically adjacent beam projections over time.

Figure 6:
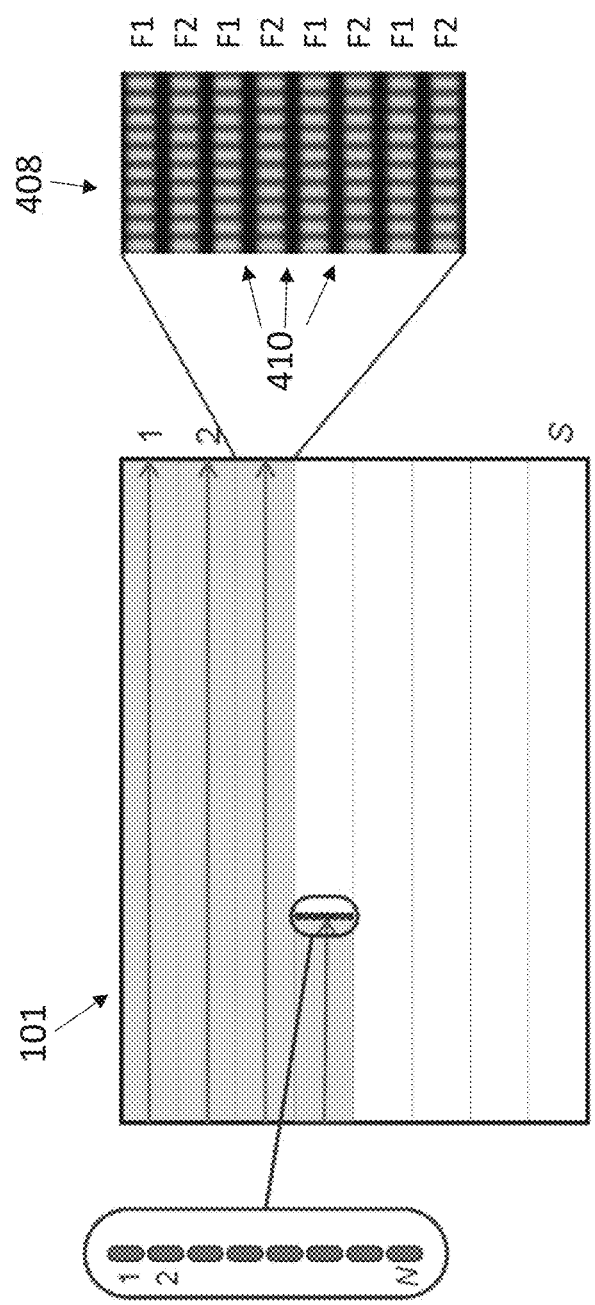
FIG. 6 illustrates an example implementation of filling the display screen by interlacing two fields.

FIG. 6 illustrates an example scenario of displaying on the screen 101 by interlacing two fields. Here, an array of N vertically spaced laser beams are scanned horizontally across the screen 101 to create S swaths that fill the screen 101, each swath being created by, for example, scanning the beam array using a respective facet of a polygon scanner with S facets. By stepping the vertical adjuster back and forth between two predetermined orientations following each rotation of the polygon mirror, two fields F1 and F2 are interlaced to increase the fill factor.

Figure 7:
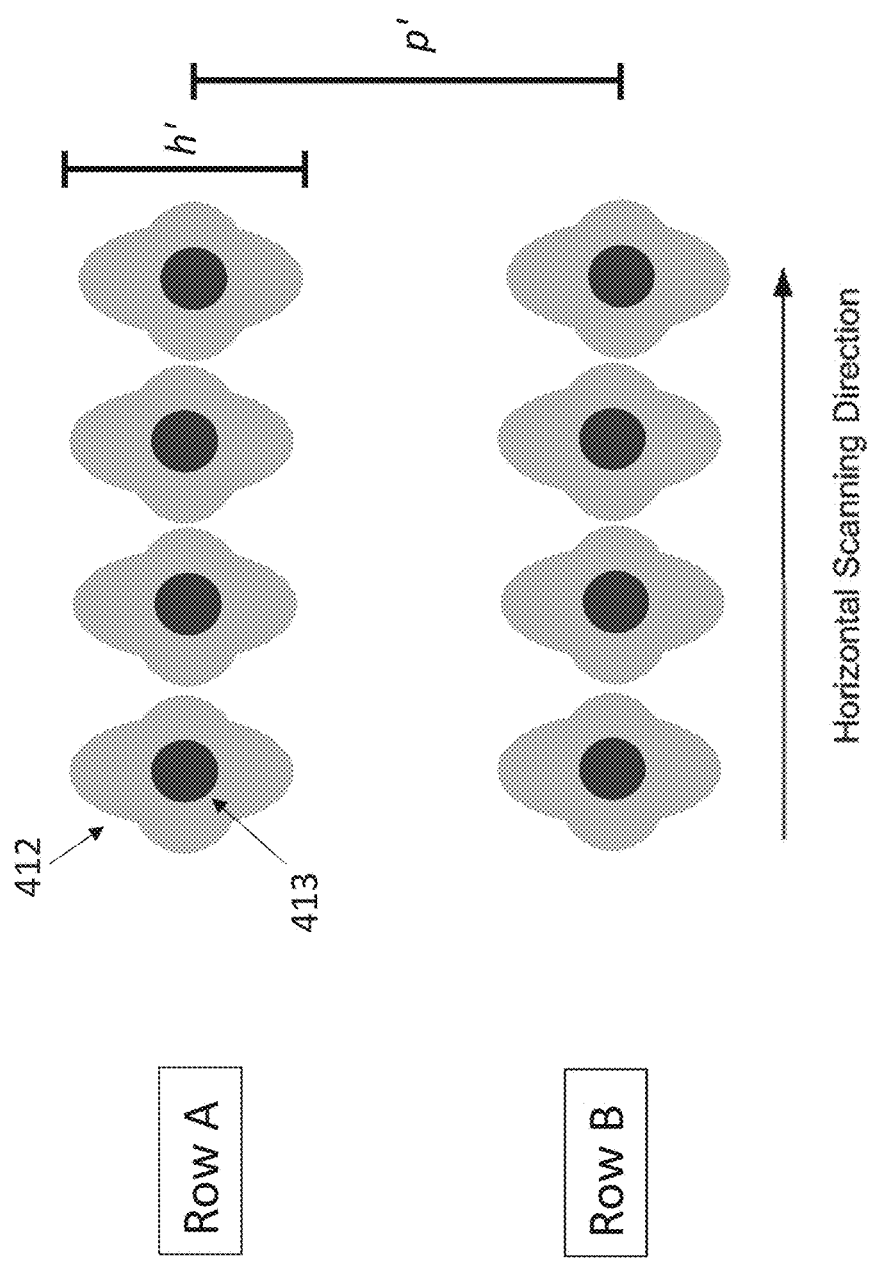
FIG. 7 illustrates a series of beam footprints projected over time in two adjacent scan lines from FIG. 6.

Looking at a close-up view 408 of one of the swaths and further referring to FIG. 7, because the vertical pitch p' between adjacent beam projections, or beam footprints, 412 is greater than the height h' of each projection along the vertical axis, gaps 410 may be present between vertically adjacent beam footprints. The gaps 410 may be observed by the viewer as black lines or partial black lines that streak across the screen 101.

The shape of the beam footprint 412 as shown in FIG. 7 is merely exemplary and can include various other shapes that are associated with different beam profiles. The dark region 413 within the footprint represents a region of peak intensity for the focused beam. In some cases, for example when multimode lasers are used to produce the optical beams, multiple peaks may be present. It should be noted that the beam footprints shown in FIG. 7 for Row A correspond to projections that a modulated optical beam produces on the screen during a period of time for one of the interlaced fields. That is, the series of beam footprints 412 shown for Row A represent the horizontal stepping of a single beam across the screen over time. Similarly, the beam footprints shown in Row B correspond to such projections for the interlaced field situated immediately below. While only one instantaneous beam footprint may be projected at a time for each row, a latent image of such a footprint may remain for a short period of time on the phosphor stripes, thereby allowing the screen to be filled with the desired image. Alternatively, or additionally, the latent image may remain within the viewer's eye as the eye has an integration time that captures the entire scanning area and perceives it as one.

Figure 8:
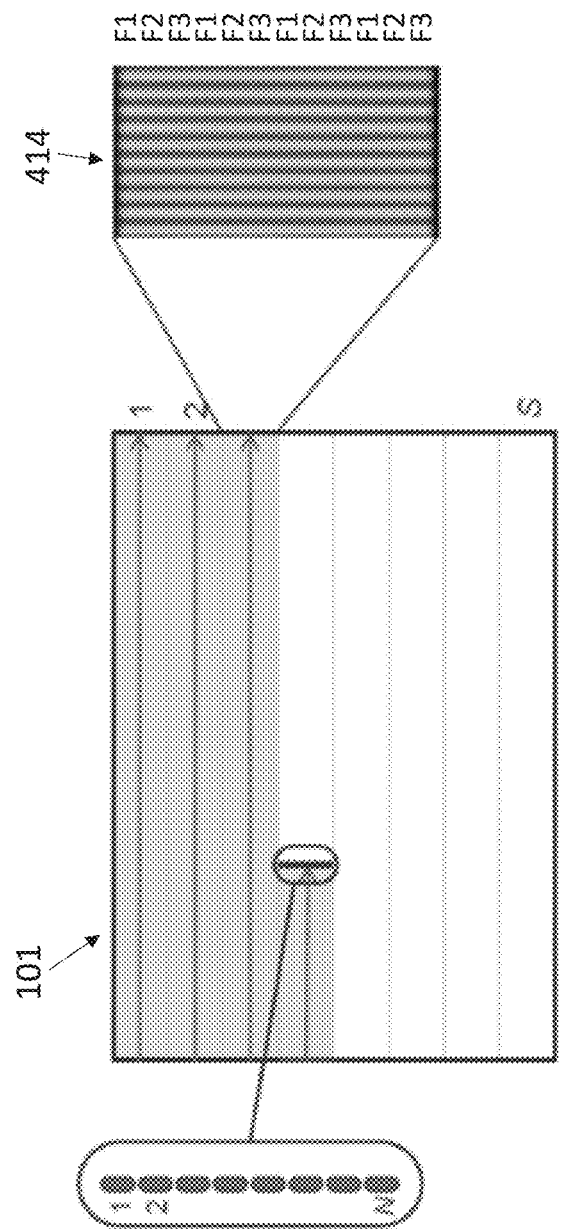
FIG. 8 illustrates an example implementation of filling the display screen by interlacing three fields.

FIG. 8 illustrates an example scenario of filling the screen 101 by interlacing three fields. The same array of N vertically spaced laser beams as shown in FIG. 6 are again scanned horizontally across the screen 101 to create S swaths that fill the screen 101. However, by stepping the vertical adjuster through three, instead of two, orientations after each polygon rotation, three fields F1, F2, and F3 are interlaced to further increase the fill factor or add more vertical resolution.

Figure 9:
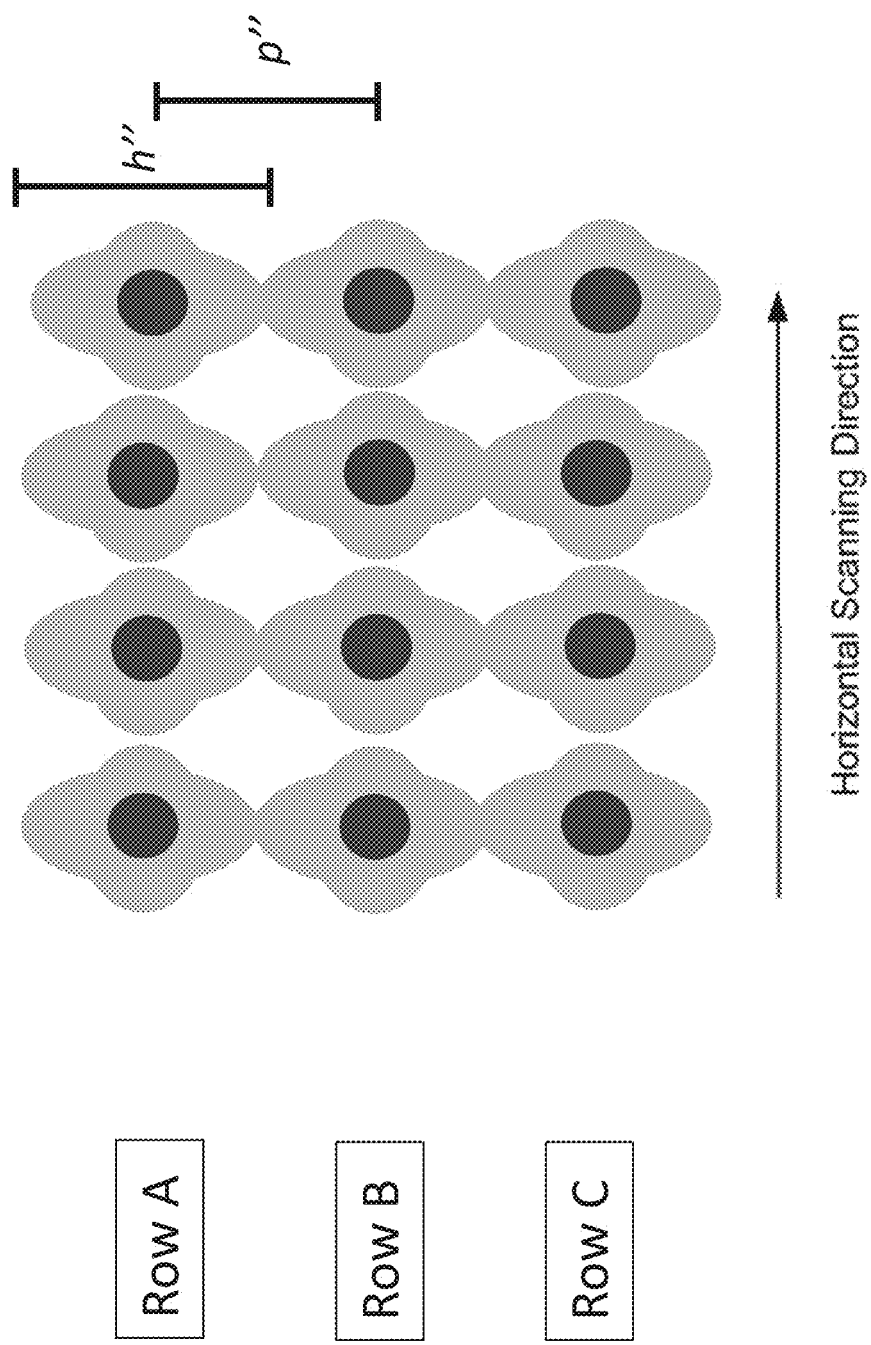
FIG. 9 illustrates a series of beam footprints projected over time in three adjacent scan lines from FIG. 8.
Figure 11:
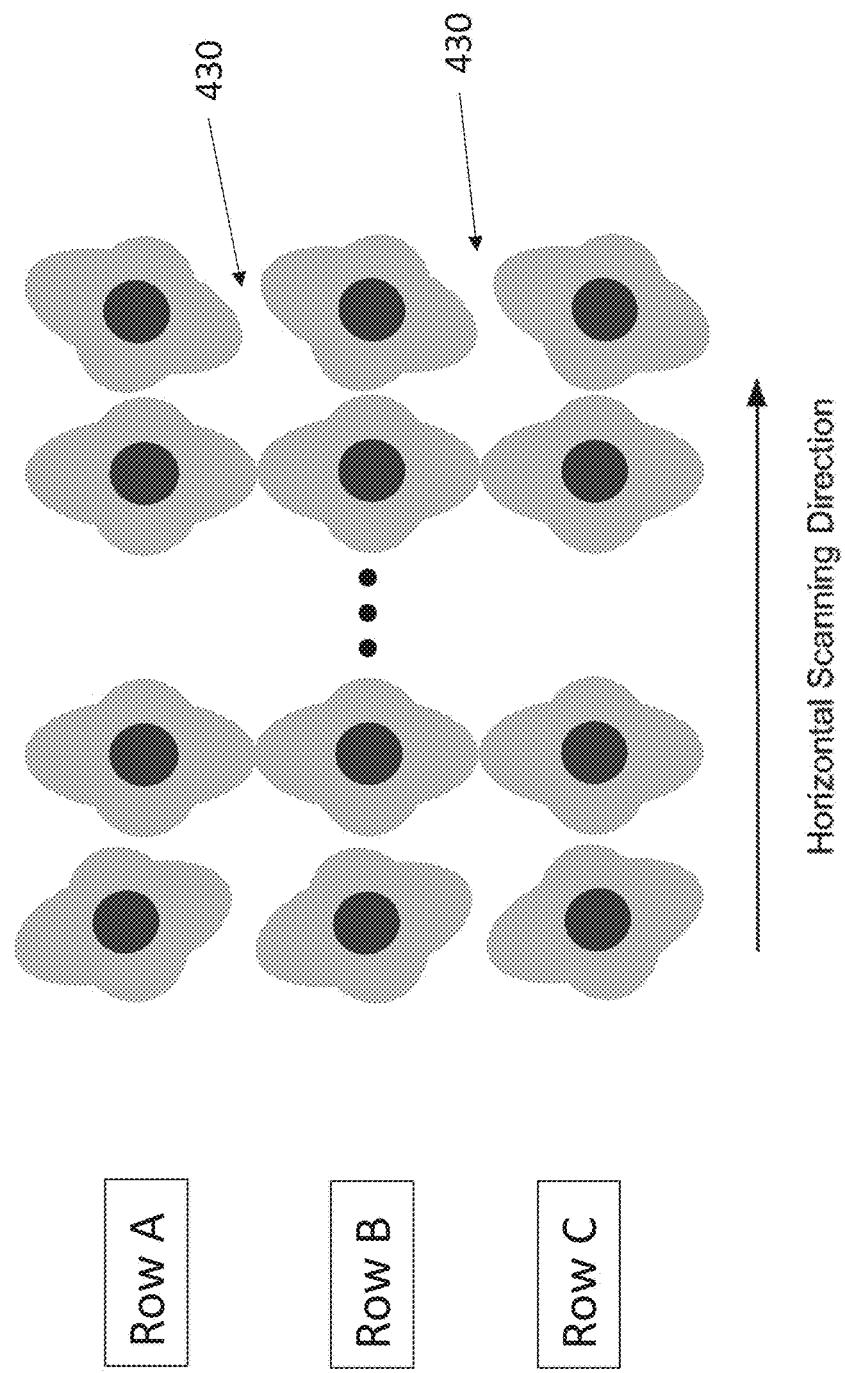
FIG. 11 illustrates another example anomaly in the series of beam footprints in FIG. 9.

Looking at a close-up view 414 of one of the swaths and further referring to FIG. 9, because the vertical pitch p" between adjacent beam footprints is now less than or equal to the height h" of each scanned beam along the vertical axis, no gaps are created between vertically adjacent beam footprints. In other words, by providing an additional vertical adjuster position to the system illustrated in FIGS. 5 and 6, the fill factor may be improved without having to increase the height of the scanned beam. As increasing the height of the scanned beam may cause crosstalk issues if the beam were to rotate as it scans across the screen leading to spillover of energy from one phosphor color to another. This is illustrated in FIG. 11. Moreover, increase the density of scanned beams vs. increasing the height of the beam has the advantage of increasing image resolution (as each additional scanned field carry image information).

While FIGS. 8 and 9 show that the beams within a swath are positioned vertically equidistant from each other, the beams may be positioned non-equidistant distances away from each other. To create equally separated beams, the vertical adjuster may be configured to at orientations that are separated by equidistant angles. In some cases, due for example to pre-existing or time-dependent variations within the display system, the vertical adjuster may be configured to be at orientations that are separated by non-equidistant angles in order to project vertically equidistant beams on the screen. In some cases, the vertical adjuster orientations may be configured to intentionally produce beams within a swath that are positioned at non-equidistant distances from each other in the vertical direction. The actual setting for the vertical adjuster orientations may be determined experimentally to yield optimal picture quality and may depend on a number of factors. For example, height of each optical beam, the beam's angle of incidence relative to the screen, movement range of the vertical adjuster, beam profile, properties of the polygon scanner, positioning tolerance of the vertical adjuster's orientations, etc. may all have an impact on how the vertical adjuster orientations are determined.

Figure 10:
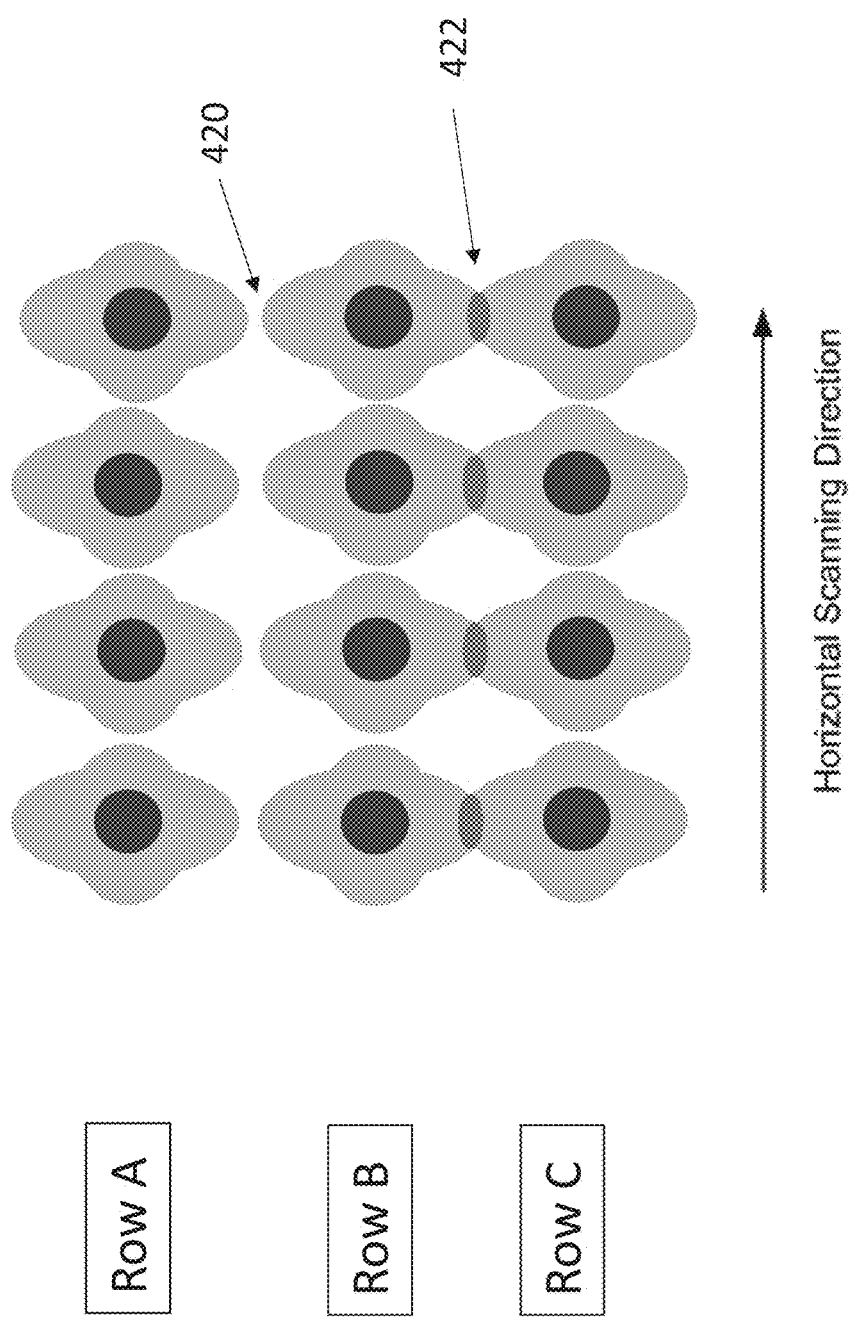
FIG. 10 illustrates an example anomaly in the series of beam footprints in FIG. 9.

Referring to FIG. 10, an example scenario is shown where the beam footprints associated with Row B (or Field 2) is shifted vertically downward, thereby creating gaps 420 between the beams in Rows A and B while creating bright spots 422 between the beams in Rows B and C that can result from excessive overlap between the beams. These kinds of anomalies may be global or localized to particular locations on the screen. Moreover, such anomalies may be known beforehand through footprint or scanning distortion information stored in memory 402 or may be detected in real-time using the footprint detector 400 or scanning image intensity maps that is integrated within the display system.

Based on the beam footprint and scanning image intensity maps information, the control system 380 (FIG. 5) can set or apply an adjustment angle, or offset, to be associated with each predetermined orientation of the vertical adjuster to eliminate any unwanted gaps 420 or bright spots 422 between vertically adjacent footprints. The adjustment angle implemented may depend on the position of the beam footprint on the screen. In some cases, the adjustment may be made while the beam is being scanned horizontally.

As noted above, beam footprint or trajectory can vary depending on where on the screen the beam is projected.

Such variation can be an inherent characteristic of the particular optical system and/or may be introduced over time due to various time-dependent factors (e.g., gravity, vibration, temperature/humidity change, etc.)

Referring further to FIG. 11, due to inherent characteristics of the optical system for example, the beam footprints may be tilted near the horizontal extremes of the screen. For example, beams projected near a left end of the screen may be rotated up to 9 degrees in one direction, while beams projected near a right end of the screen may be rotated up to 9 degrees in the opposite direction. Due to such rotation, or tilting, of the beams, an effective height of the beam footprints may be reduced in such regions, resulting in gaps 430 being formed between vertically adjacent beam footprints. Accordingly, when determining the number of vertical adjuster positions that will result in the minimization of gaps, basing the determination up the smallest vertical height of a beam footprint found on the screen can ensure that no gaps are formed even in the regions of the screen where due to rotation of the beams or for other reasons the effective height of the beam footprint is reduced.

Figure 12:
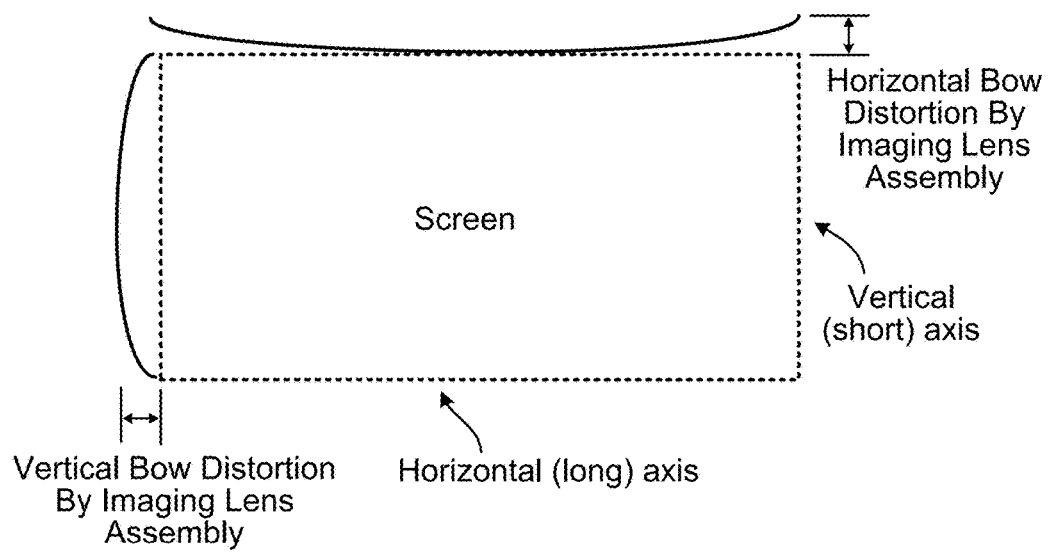
FIG. 12 illustrates an example bow distortion on the display screen.
Figure 13:
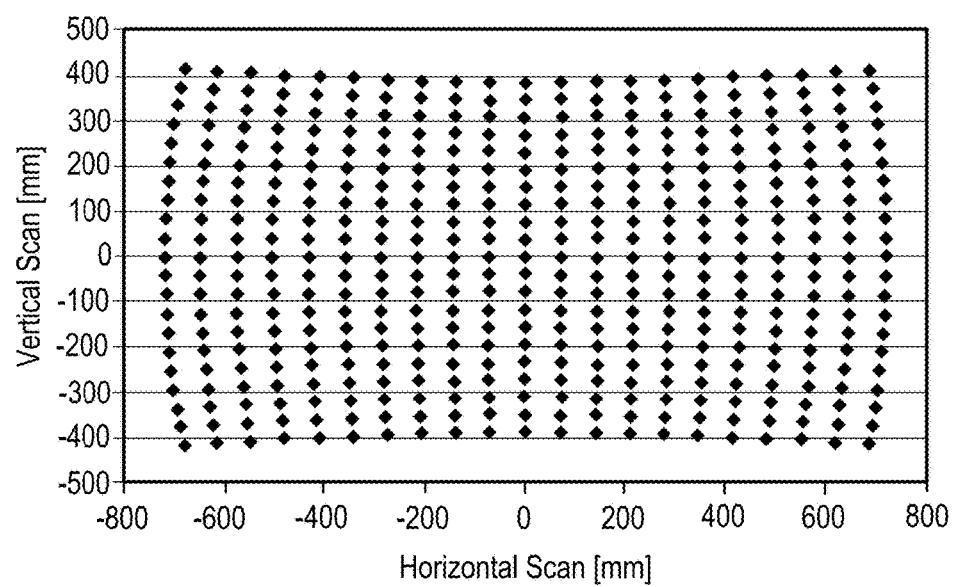
FIG. 13 illustrates an example of measured distortions on the display screen.

FIGS. 12 and 13 illustrate examples of other types of variations that can lead to non-uniform filling of the screen. For example, as shown in FIG. 12, vertical and horizontal bow distortions can occur when using a two-dimensional f-theta scan lens located in the optical path between the scanning optical module (e.g., the polygon 350 and galvo mirror 340) and the screen 101. As illustrated, the bow distortion in each direction increases from the center of the screen towards the edge of the screen as the incident angle of the light to the scan lens increases.

FIG. 13 shows an example of a map of measured beam positions on a screen with the above-noted optical bow distortions. The effects of the vertical and horizontal bow distortions caused by a scan lens assembly can be measured, for example, together with the beam footprint measurement. Based on the measured distortions, e.g., beam spot spacing variations, the optical energy of the optical pulses can be adjusted to counter the non-uniformity in screen brightness caused by the measured distortions. U.S. patent application Ser. No. 12/796,591 entitled "LOCAL DIMMING ON LIGHT-EMITTING SCREENS FOR IMPROVED IMAGE UNIFORMITY IN SCANNING BEAM DISPLAY SYSTEMS" and filed on Jun. 8, 2010, describes examples of removing distortions and improving image uniformity and is incorporated by reference as part of the specification of this application.

Referring again to FIG. 10, bright spots 422 can occur when the vertically overlapping portions between adjacent beam footprints are too large. Such a phenomenon can occur for display systems where the number of vertical adjuster positions has been set in order to maximize the fill factor by eliminating potential gaps. In such cases, the optical energies, or intensities, associated with the corresponding optical pulse may be reduced for one of the overlapping beam pulses or the other or both, thereby remapping the intensity distribution so that the observer does not see hot spots. By decreasing the intensity of the beams associated with the excess overlap, the brightness of the overlapping portion may be reduced and appear more uniform to the viewer.

Figure 14:
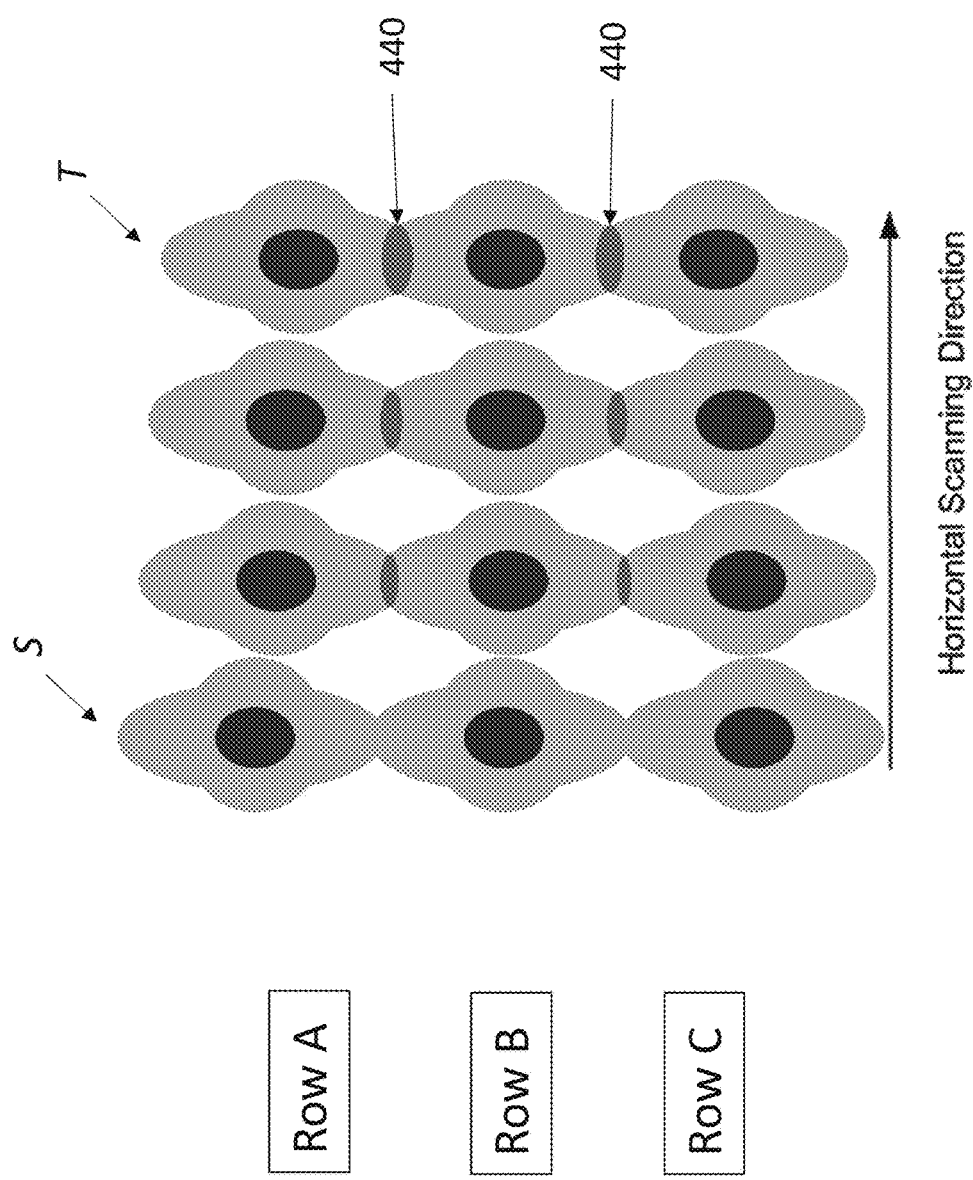
FIG. 14 illustrates a series of beam footprints projected over time in three adjacent scan lines, where the beam footprints converge along the scanning direction to create bright spots in overlapping regions.
Figure 15:
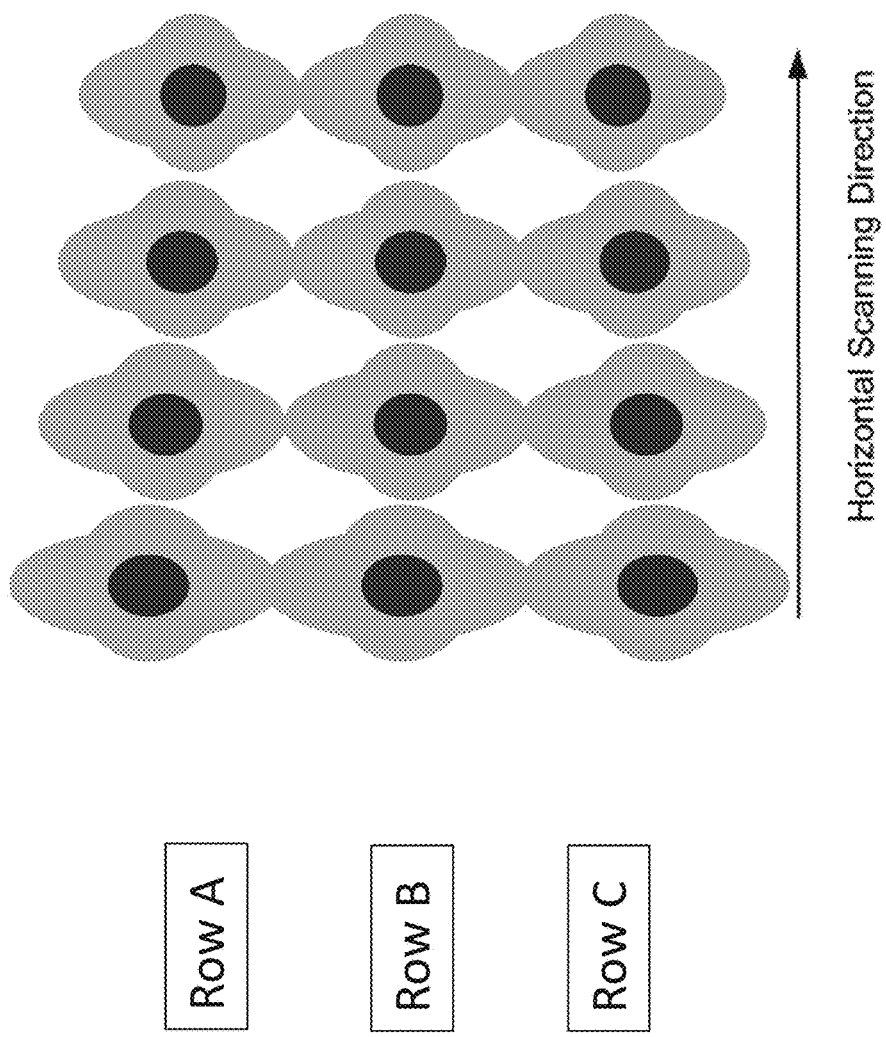
FIG. 15 illustrates the series of bean footprints from FIG. 14 following an exemplary optical energy reduction in the affected beams to reduce the bright spots.

FIG. 14 illustrates a region of the screen where the parallel horizontal scanning lines converge along the scanning direction. So while no gaps or bright spots may be formed for beam footprints in column S, the use of beam footprints having the same height in the converged columns, for example column T, can lead to excess overlap that results in bright spots 440. However, by correspondingly reducing the optical energies associated with the converged beams to decrease intensity of the respective beams, the bright spots 440 may be reduced—as illustrated in FIG. 15.

As explained above, the spacing between a pair of adjacent beam footprints should be such that the vertical fill factor is maximized. This is generally achieved when the pitch between adjacent footprints is equal to or less than the height of the associated beam footprint. However, because laser beams, and other types of optical beams, can have different kinds of beam profiles, the "height" of the beam may not always be clearly defined.

Figure 16A:
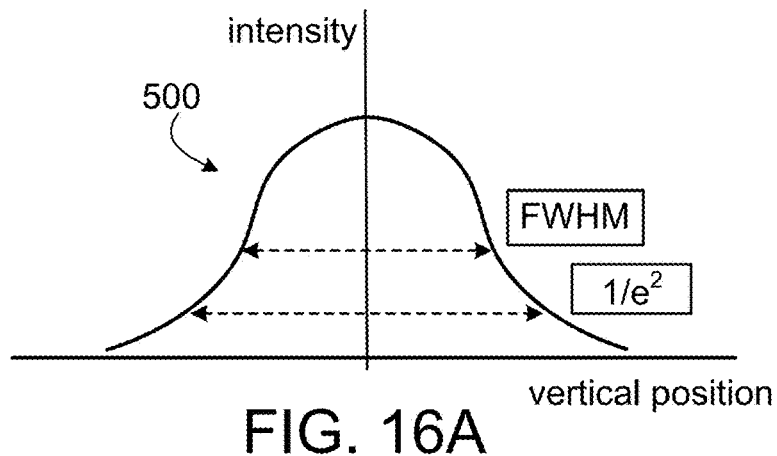
FIGS. 16A-C illustrate example optical beam profiles.

For example, referring further to FIG. 16A, given a Gaussian profile of the optical beams' energy, two vertically adjacent footprints may be considered to have no gap therebetween if there is a vertical overlap between the beams that is greater than a first threshold, where the first threshold can represent a non-zero minimal vertical overlap that is required to eliminate the appearance of a gap to the user and help improve brightness uniformity. Because the distance between vertically adjacent beam footprints, or pitch P, as well as an effective height H of a beam footprint can both vary as a function of position on the screen, the determination of what the first threshold should be can be made based on a screen location having the largest difference between P and H, thereby ensuring that a gap is avoided for all recorded beam positions on the screen. The beam footprint and position information as used in this determination may be obtained from the beam footprint measurement process as noted above.

Figure 16B:
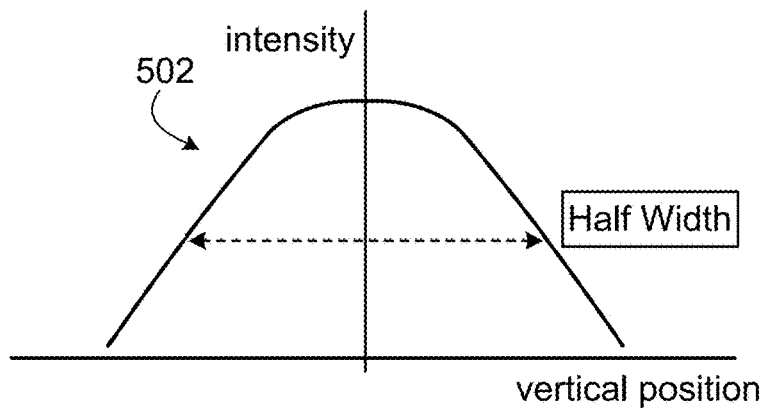
Figure 16C:
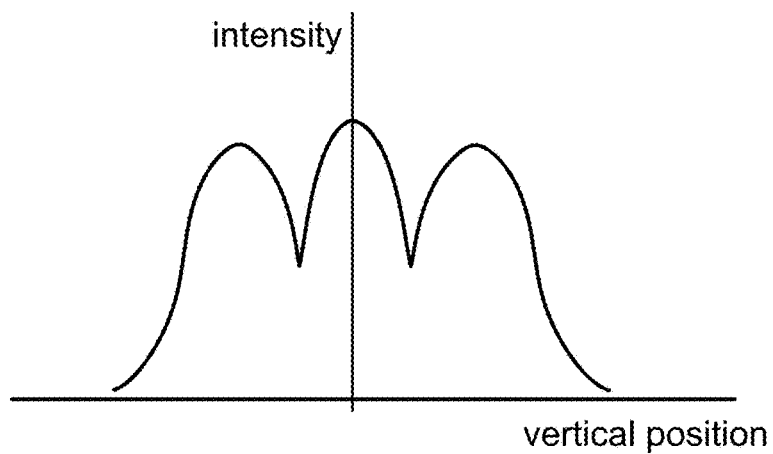

In some cases, where the beam profile is Gaussian, the first threshold may represent the point at which points associated with the $1/e^2$ widths of the respective beams pass each other. In some cases, the first threshold may be derived experimentally based on the particular characteristics of the display system and/or the viewer (e.g., viewing distance). As another example, the optical beam can have a trapezoidal profile, as illustrated in FIG. 16B, or a multimode shape as in FIG. 16C. Alternatively, in some cases, the first threshold may represent the point at which the respective tails of the beams just begin to touch each other.

Referring back to FIGS. 14 and 15, it was noted that excess overlap between adjacent beam footprints can result in bright spots 440. To avoid such bright spots, the optical energies associated with the beam footprints at issue may be decreased so that, for example, the size that is associated with the overlapping region does not surpass a second threshold. That is, by further relying on the collected beam footprint data to decrease the intensities of one or both of the overlapping beams so that the associated intensity of the overlapping region is less than this second threshold, bright spots may be avoided across the entire screen. Accordingly, by ensuring that the overlapping region is greater than the first threshold but less than the second threshold, both gaps and bright spots may be avoided. In some cases, the second threshold may refer not to the size of the overlapping region but rather the intensity that is associated with such region. In other words, once the size of the overlap between adjacent beam footprints satisfy the first threshold, thereby ensuring no gap, the resulting intensity of the overlapping region can be controlled to be kept below the second threshold, thereby ensuring that the appearance of bright spots is avoided.

When decreasing the optical energy of the affected beam, the height of the beam footprint as perceived by the user may decrease correspondingly. However, the energy decrease should be controlled such that the resulting beam height does not lead to an overlapping region that falls below the first threshold (i.e. creates gaps). The second threshold may be based on intensity, thus indicating a maximum intensity that the overlapping region should stay under. Notably, the optical energy may be adjusted on a per pixel basis, thereby allowing the adjustment of size/intensity for individual pixels. While the energy for each pixel is also dynamically controlled by corresponding image data, for example to display a moving picture on the screen, the second threshold effectively serves as a gain-controlling mechanism that limits the maximum intensity produced in the overlapping region.

In some cases, the second threshold may be based on size, thus indicating a maximum allowable physical size of the overlapping region. For example, referring to FIG. 16A, the second threshold may represent the amount of overlap at which the points associated with the $1/e^2$ widths of the respective beams pass each other. In some cases, the second threshold may represent the amount of overlap at which the points associated with the full width half maximum of the Gaussian beams pass each other. Referring to the trapezoidal beam profile shown in FIG. 16B, the second threshold may represent the amount of overlap at which the points associated with the half widths of the beams pass each other.

In some implementations, the image information associated with each video frame buffer may not be in a format compatible with the number of orientations of the vertical adjuster. For example, referring to FIG. 17A, a series of images shown on the screen over time is represented as Image 1, Image 2, Image 3, etc. Here, each image is shown as having a set of pixel values A associated with Field 1 and a second set of pixel values B associated with Field 2. Thus, by switching the vertical adjuster back and forth between positions corresponding Field 1 and Field 2, a single image made up of pixel values A and B can be displayed on the screen.

However, if the imaging system of FIG. 17A is modified to include three fields (Field 1-3) that correspond to three distinct positions of the vertical adjuster, then additional pixel values may be needed. For example, if pixel value A is assigned to Field 1 and pixel value B is assigned to Field 3, then an additional pixel value will be needed for Field 2. One example scheme for filling the added field is shown in FIG. 17B. Here, the pixel value for Field 1 (A) and the pixel value from Field 3 (B) are alternately assigned to Field 2 over time in order to provide a vertically filled image. Alternatively, FIG. 17C illustrates an interpolation method in which the pixel value for Field 2 is interpolated, in this case through simple averaging, from the pixel values of Field 1 and Field 3. Various other types of filling and interpolation methods may be utilized in assigning an appropriate pixel value to the added field. As another example, a cubic interpolation method based on 4 points may be used.

Of course, interpolation and other pixel filling methods may not be needed if there is sufficient pixel data to fill the added field. For example, FIG. 17D illustrates pixel values A, B, and C being assigned to Fields 1, 2, and 3, respectively. The additional pixel value corresponding to the added field may be available, for example, if the native resolution is increased correspondingly.

Figure 18A:
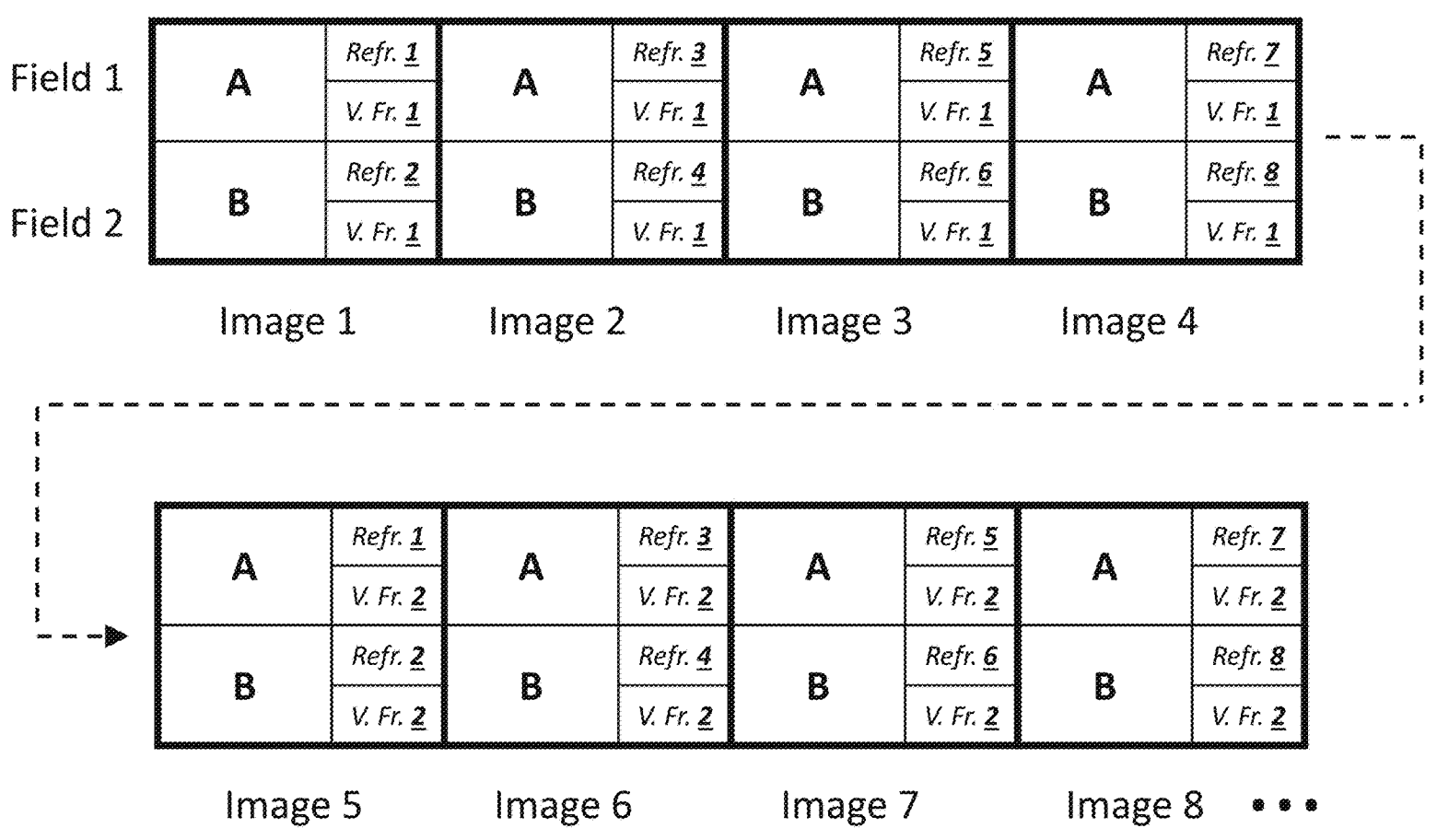

In some cases, a two-field imaging system may rely on a video frame that is rendered, or painted across the screen, multiple times before progressing to the next video frame. For example, if a video frame is updated at 60 Hz, then each video frame may be refreshed 8 times at 480 Hz on the screen. More specifically, as shown in Images 1-4 in FIG. 18A, a single video frame may yield 8 refreshes on the screen, with each refresh corresponding to a distinct pixel value. As further illustrated in FIG. 18A, the first two refreshes for video frame 1 may lead to displaying a first image Image 1 on the screen that is made up of pixel value A and pixel value B. The subsequent two refreshes for video frame 1 may lead to displaying a second image Image 2 that is made up of pixel values A and B. Once 8 refreshes in total have been completed (forming Images 1-4 on the screen over time in the process), the video frame will update to video frame 2, and Images 5-8 will then be displayed in a similar manner. For a polygon scanner-based system, each render/refresh may correspond to a single full rotation of the polygon scanner.

Figure 18B:
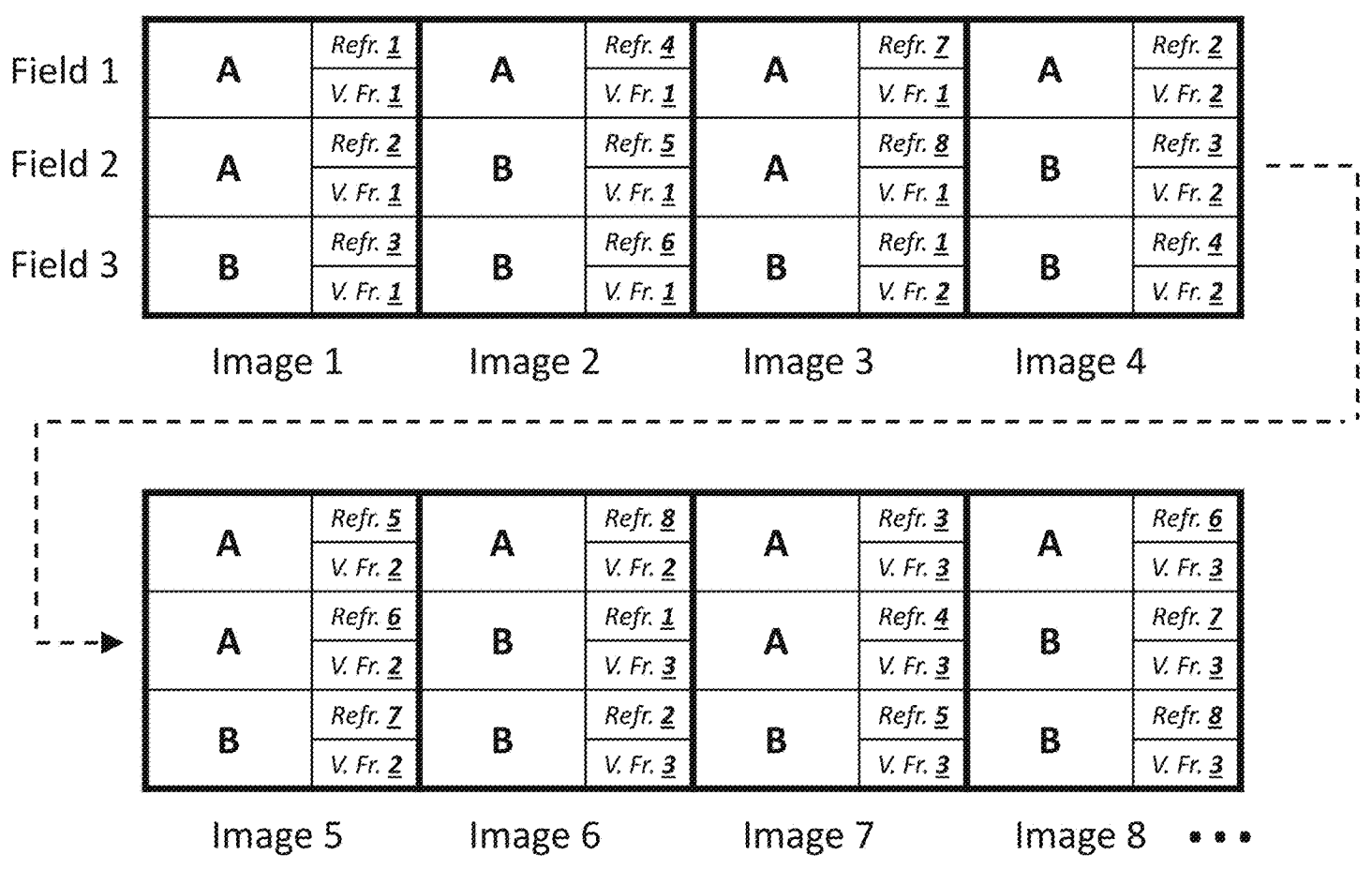

Referring now to FIG. 18B, a three-field imaging system is shown. However, if the 8 refreshes per video frame scheme is maintained, there may be instances where there is insufficient pixel information. In other words, because a three-field system as illustrated in FIG. 18B requires 3 refreshes to form one complete image on the screen (as opposed two 2 refreshes in the previous example shown in FIG. 18A), a video frame that is rendered 8 times as before may only be able to provide enough pixel information for 2 and ⅔ images. In such cases, pixel value from the subsequent video frame may be used to fill the missing ⅓ image. For example, looking at FIG. 18B, relying on just the 8 refreshes of video frame 1 would not provide a sufficient number of pixel values to cover the bottom ⅓ of Image 3; however, as shown, the corresponding pixel value from video frame 2 may be assigned to Field 3 of Image 3 in order to completely fill Image 3. This way, video frames designed for a two-field imaging system may be used in a three-field system without changing the associated refresh rates.

While this document contains many specifics, these should not be construed as limitations on the scope of an invention or of what may be claimed, but rather as descriptions of features specific to particular embodiments of the invention. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements, and other implementations can be made based on what is described and illustrated in this application.

What is claimed is:

1. A scanning beam display system, comprising:
   an optical module;
   an image control module that is configured to receive image information and convey corresponding pixel information to the optical module, the optical module being configured to produce a plurality of optical beams that are modulated based on the pixel information to thereby convey images to be displayed, wherein each of the optical beams convey pixel information; and
   a display screen configured to receive the plurality of optical beams to display images conveyed by the optical beams, the plurality of optical beams being scanned in a generally horizontal direction across the display screen,
   wherein the optical module comprises:

a vertical adjuster placed in optical paths of the optical beams to control and adjust positions of the optical beams along a generally vertical direction on the display screen, and a control unit configured to receive control instructions for the vertical adjuster and to control the vertical adjuster to be at one of a predetermined number of orientations to place the optical beams at a corresponding distinct position of a plurality of positions along the vertical direction on the display screen, the control unit causing the vertical adjuster to reorient periodically to another of the orientations, wherein the control unit is further configured to apply an adjustment offset associated with each orientation of the vertical adjuster such that each immediately vertically adjacent pair of beam footprints projected on the display screen resulting from the plurality of positions have a vertical overlap that is larger than a first threshold, wherein the control unit is further configured to decrease an optical energy associated with each beam footprint such that the resulting vertical overlap of each immediately vertically adjacent pair of beam footprints is less than a second threshold.

2. The scanning beam display system of claim 1, wherein the second threshold is a maximum allowable size associated with the vertical overlap between any two immediately vertically adjacent beam footprints.

3. The scanning beam display system of claim 1, wherein the second threshold is a maximum allowable intensity of the vertical overlap between any two immediately vertically adjacent beam footprints.

4. The scanning beam display system of claim 1, wherein decreasing the optical energy reduces a height of a corresponding beam footprint.

5. The scanning beam display system of claim 1, wherein the optical module further comprises a polygon scanner positioned in the optical paths of the optical beams and comprising a rotation axis around which the polygon scanner rotates to scan the optical beams horizontally across the display screen, the polygon scanner including a plurality of polygon facets that are each sized to simultaneously receive the optical beams and each tilted with respect to the rotation axis at different facet tilt angles, respectively, to scan the optical beams horizontally at different vertical positions on the display screen, respectively.

6. The scanning beam display system of claim 5, wherein the vertical adjuster reorients to a different orientation after each complete rotation of the polygon scanner.

7. The scanning beam display system of claim 1, wherein the vertical adjuster, by switching between the predetermined number of orientations, causes the beam footprints to be projected on the display screen over time such that there are no gaps in the vertical direction between immediately vertically adjacent pairs of beam footprints.

8. The scanning beam display system of claim 7, wherein the predetermined number of orientations is three or more different orientations.

9. The scanning beam display system of claim 1, wherein the orientations of the vertical adjuster are separated by equidistant angles.

10. The scanning beam display system of claim 1, wherein the orientations of the vertical adjuster are separated by non-equidistant angles.

11. The scanning beam display system of claim 1, wherein the pixel information associated with each orientation of the vertical adjuster for a vertically continuous group of beam footprints is different.

12. The scanning beam display system of claim 1, wherein the pixel information associated with two of the orientations of the vertical adjuster for a vertically continuous group of beam footprints are same.

13. The scanning beam display system of claim 1, wherein the pixel information associated with one of the orientations of the vertical adjuster for a vertically continuous group of beam footprints is interpolated from the pixel information associated with two other orientations of the vertical adjuster for the vertically continuous group of beam footprints.

14. The scanning beam display system of claim 1, wherein the control unit is configured to increase or decrease an optical energy associated with each beam footprint to limit non-uniformity in screen brightness.

15. The scanning beam display system of claim 1, further comprising a memory configured to store beam footprint information of a beam footprint formed by each of the optical beams on the display screen, the beam footprint information including beam height data and position data of the beam footprint, wherein the control unit is configured to receive control instructions that are determined based on the stored beam footprint information.

16. The scanning beam display system of claim 15, wherein the memory is configured to receive beam footprint information from a beam footprint determination unit.

17. The scanning beam display system of claim 16, wherein the optical module includes the beam footprint determination unit.

18. A scanning beam display array, comprising two or more scanning beam display systems as in claim 1 that are arranged adjacent to each other, wherein the orientations and associated adjustment offsets of each of the corresponding vertical adjusters are synchronized.

* * * * *